US012675677B2

(12) United States Patent
Tran et al.

(10) Patent No.: US 12,675,677 B2
(45) Date of Patent: Jul. 7, 2026

(54) SPIKE ANALYSIS WITH CONTEXTUALLY INFORMED SPIKE EXPLANATIONS GENERATED BY USE OF LARGE LANGUAGE MODELS

(71) Applicant: Meltwater News US Inc.

(72) Inventors: Tuan Tran, Chicago, IL (US); Emil Andreas Klintberg, San Francisco, CA (US); Sushmita Das, San Francisco, CA (US); Julio Romano, São Paulo (BR); Josephine Wing Yee Chan, Toronto (CA); Hearad Tehranchian, Toronto (CA); Ebenezer Isaac, Toronto (CA); Franck Babin, Las Vegas, NV (US); Giorgio Orsi, London (GB); Aditya Jami, San Francisco, CA (US); David Delgado, London (GB); Jinsong Guo, London (GB); Georg Gottlob, Nicosia (CY)

(73) Assignee: Meltwater News US Inc., Redwood City, CA (US)

( * ) Notice: Subject to any disclaimer, the term of this patent is extended or adjusted under 35 U.S.C. 154(b) by 0 days.

(21) Appl. No.: 18/757,208

(22) Filed: Jun. 27, 2024

(65) Prior Publication Data

US 2026/0004115 A1      Jan. 1, 2026

(51) Int. Cl.
*G06N 3/049* (2023.01)
*G06F 16/93* (2019.01)

(52) U.S. Cl.
CPC ............. *G06N 3/049* (2013.01); *G06F 16/93* (2019.01)

(58) Field of Classification Search
None
See application file for complete search history.

(56) References Cited

U.S. PATENT DOCUMENTS

| | | |
|---|---|---|
| 9,218,527 B2 | 12/2015 | Lakshminarayan et al. |
| 9,229,977 B2 | 1/2016 | Chadha et al. |

(Continued)

OTHER PUBLICATIONS

Winatmoko, Y.A. et al., "Automatic summarization of tweets in providing Indonesian trending topic explanation," 4th Intl. Conf. on Electrical Engineering and Informatics, Procedia Technology 11 (2013) pp. 1027-1033. (Year: 2013).*

(Continued)

*Primary Examiner* — Brian M Smith
(74) *Attorney, Agent, or Firm* — FRESH IP PLC; Clifford D. Hyra; Aubrey Y. Chen

(57) ABSTRACT

This disclosure addresses deficiencies in existing methods for analyzing spikes in time-series data, particularly when dealing with vast document repositories. A method includes receiving a user specification of objects of interest, and by subsequently identifying spikes of mentions of these objects in the documents. The method includes retrieving metric data and context data related to mentions of objects of interest in relevant documents from a repository, both from spikes and other time intervals. By analyzing these documents, it is possible to pinpoint the key factors driving the spikes. Finally, use of an LLM provides capabilities to generate comprehensive explanations. This is achieved by submitting one or more prompts to LLM(s), where the prompts incorporate the specification of the objects of interest (or a reformulation thereof), the identified driving factors and a number of representative documents connected to the key driving factors.

26 Claims, 7 Drawing Sheets

(56) References Cited

U.S. PATENT DOCUMENTS

| | | | |
|---|---|---|---|
| 10,270,788 B2 | 4/2019 | Faigon et al. | |
| 10,277,693 B2 | 4/2019 | Hendrickson et al. | |
| 10,560,465 B2 | 2/2020 | Ghare et al. | |
| 10,614,364 B2 | 4/2020 | Krumm et al. | |
| 12,061,970 B1 * | 8/2024 | Lo ............................ | G06N 3/10 |
| 2021/0012909 A1 | 1/2021 | Koh et al. | |
| 2024/0330348 A1 * | 10/2024 | Zawadowskiy ....... | G06F 21/563 |
| 2025/0139367 A1 * | 5/2025 | Manandise ........... | G06F 40/211 |
| 2025/0200355 A1 * | 6/2025 | Ragukumar ............. | G06N 3/08 |

OTHER PUBLICATIONS

Nakshatri, N. et al., "Using llm for improving key event discovery: temporal-guided news steam clustering with event summaries," Findings of the Association for Computational Linguistics: EMNLP 2023, pp. 4162-4173. (Year: 2023).*

Dar K. S. et al., A Review of Time-Series Anomaly Detection Techniques: A Step to Future Perspectives, Advances in Intelligent Systems and Computing, Apr. 2021, 1-13, Springer.

Blázquez-García A. et al., A Review on Outlier/Anomaly Detection in Time Series Data, ACM Computing Surveys, Apr. 2021, 56:1-56:33, vol. 54 No. 3.

Schmidl S. et al., Anomaly Detection in Time Series: A Comprehensive Evaluation, Proceedings of the VLDB Endowment, May 1, 2022, 1779-1797, vol. 15 No. 9, Association for Computing Machinery.

Hochenbaum J. et al, Automatic Anomaly Detection in the Cloud Via Statistical Learning, GitHub, Apr. 24, 2017, 1-13, Twitter, Inc.

Choi K. et al., Deep Learning for Anomaly Detection in Time-Series Data: Review, Analysis, and Guidelines, IEEE Access, Aug. 26, 2021, 120043-120065, vol. 9, IEEE.

Wang X. et al., Exact variable-length anomaly detection algorithm for univariate and multivariate time series, Data Mining and Knowledge Discovery, Jul. 31, 2018, 1806-1844, vol. 32, Springer.

Gupta M. et al., Outlier Detection for Temporal Data: A Survey, IEEE Transactions on Knowledge and Data Engineering, Jan. 2014, 1-20, vol. 25 No. 1, IEEE.

Lai K. H. et al., Revisiting Time Series Outlier Detection: Definitions and Benchmarks, GitHub, Jul. 29, 2021, 1-13.

Kieu T. et al., Robust and Explainable Autoencoders for Unsupervised Time Series Outlier Detection—Extended Version, IEEE ICDE, 2022, IEEE.

Wilson S. B. et al., Spike detection: a review and comparison of algorithms, Clinical Neurophysiology, 2002, 1873-1881, vol. 113, Elsevier.

* cited by examiner

 (November 15, 2023) — 410
The increase in volume is due to the Supreme Court's rejection of Rishi Sunak's plan to deport asylum seekers to Rwanda. This ruling has sparked controversy and debate, with some supporting the decision and others criticizing it. Rishi Sunak's response and the government's subsequent actions have also contributed to the spike in news and social media discussions.

 (November 26, 2023) — 420
The increase in volume is due to a series of political developments and controversies within the UK Conservative Party. These include the delay in signing a treaty with Rwanda, allegations of offering money to a Tory MP to defect, concerns about the safety of Jewish people on UK streets, and disagreements within the party over migration policies. These events have generated significant media attention and public interest, leading to a spike in news and social media discussions.

 (December 7, 2023) — 430
The increase in volume is due to the controversy surrounding Rishi Sunak's Rwanda Bill and the potential leadership crisis it has caused. Suella Braverman's statement that the bill will fail in its current form, along with the resignation of Immigration Minister Robert Jenrick, has sparked discussions and concerns within the Conservative Party. There are also debates about the UK's plan to send asylum seekers to Rwanda, with critics questioning its legality and potential consequences.

 (December 11, 2023) — 440
The increase in volume is due to the ongoing COVID inquiry involving Rishi Sunak, the UK Chancellor of the Exchequer. Sunak's contradicting statements, his apology at the inquiry, and the involvement of other politicians have generated significant interest and discussion in the media and on social platforms. Additionally, the controversy surrounding the proposed Rwanda bill and Gary Lineker's involvement in promoting a campaign against it has also contributed to the spike in volume.

SPIKE ANALYSIS WITH CONTEXTUALLY INFORMED SPIKE EXPLANATIONS GENERATED BY USE OF LARGE LANGUAGE MODELS

FIELD

This disclosure teaches methods, techniques, and systems related in general to the field of information processing. More specifically, it is concerned with the domain of spike analysis in time-series data, including the detection of spikes and the generation of comprehensive explanations for the underlying causes of such spikes.

BACKGROUND

Spike analysis is a crucial analytical process used to identify and examine sudden increases (spikes) in data within a given time frame, often observed in time-series data. This technique is instrumental in various fields such as finance, web traffic analysis, social media monitoring, and more, providing insights into abnormal data behaviors that signify potential trends, events, or anomalies. By understanding the driving factors or triggers of spikes, researchers and analysts can pinpoint the timing, magnitude, and duration of these unusual data points, and investigate their underlying causes. Spike analysis involves not only the detection of these abrupt changes but also a detailed examination of the context surrounding them, enabling the identification of driving factors or triggers. The outcome of such analysis can inform decision-making processes, highlight opportunities for intervention, or reveal emerging trends.

Existing methods for spike analysis in time-series data, including traditional statistical techniques, causal inference, and machine learning models, offer valuable insights, but often encounter significant drawbacks that curtail their effectiveness in delivering comprehensive and context-rich explanations of spikes. While traditional statistical methods and causal inference techniques are adept at detecting anomalies and identifying potential correlations, they typically necessitate extensive manual interpretation and substantial domain expertise to elucidate the underlying causes of spikes. Similarly, machine learning models are proficient at recognizing patterns and outliers; however, they generally fall short of providing deep explanations for these anomalies, with their interpretative scope largely confined to statistical correlations. Furthermore, even as some advanced machine learning and hybrid approaches begin to integrate explanatory features, they frequently lack the depth and accessibility required for non-expert stakeholders to make informed decisions. A significant challenge lies in their ability to process and analyze qualitative data effectively. For instance, text from relevant documents, which is crucial for uncovering nuanced insights into the specific causes of observed data spikes, remains underutilized. This limitation becomes particularly acute when analyzing time series data associated with extensive document repositories. Traditional approaches struggle to penetrate the vast, unstructured textual data that often accompany spikes, markedly in scenarios where understanding the context—embedded within large volumes of documents—is essential for crafting meaningful explanations for the occurrence of spikes.

The motivation behind the present disclosure stems from the critical need to bridge the gap between the detection of spikes in time-series data and the provision of insightful, actionable explanations for these spikes.

SUMMARY

It is to be understood that both the following summary and the detailed description are exemplary and explanatory and are intended to provide further explanation of the disclosure as claimed. Neither the summary nor the description that follows is intended to define or limit the scope of the disclosure to the particular features mentioned in the summary or in the description.

In certain embodiments, the disclosed embodiments may include one or more of the features described herein.

In one example, a method may include, receiving, by at least one processor, a task specification comprising a specification of the object(s) of interest, followed by accessing a document repository, the document repository storing documents in non-transitory memory, and employing a document search engine to compute relevant metric data for mentions of the object(s) of interest across a list of timestamps, subsequently generating, by at least one processor, a time series of metric data and detect spikes within this time series, then accessing a document repository to retrieve contextual data of mentions of the object(s) of interest coinciding with detected spikes, thereby conducting, by at least one processor, contextual analysis to identify the primary driving factors that contribute significantly to the observed spikes, selecting, by at least one processor, representative documents based on each driving factor and, finally, employing a machine learning model to generate comprehensive spike explanations, by at least one processor.

In another example, a system may include a computing device having a memory and at least one processor to receive a task specification comprising a specification of the object(s) of interest, and access a document repository, the document repository storing documents in non-transitory memory, and employing a document search engine to compute relevant metric data for mentions of the object(s) of interest across a list of timestamps, subsequently generate a time series of metric data and detect spikes within this time series, then access a document repository to retrieve contextual data of mentions of the object(s) of interest coinciding with detected spikes, thereby conduct contextual analysis to identify the primary driving factors that contribute significantly to the observed spikes; select representative documents based on each driving factor and employ a machine learning model to generate comprehensive spike explanations.

In another example, a non-transitory computer-readable storage medium may have instructions stored thereon that, when executed by at least one computing device cause the at least one computing device to perform operations, the operations including receiving a task specification comprising a specification of the object(s) of interest, followed by accessing a document repository, the document repository storing documents in non-transitory memory, and employing a document search engine to compute relevant metric data for mentions of the object(s) of interest across a list of timestamps, subsequently generating, a time series of metric data and detect spikes within this time series, then accessing a document repository to retrieve contextual data of mentions of the object(s) of interest coinciding with detected spikes, thereby conducting contextual analysis to identify the primary driving factors that contribute significantly to the observed spikes; selecting representative documents based on each driving factor and, finally, employing a machine learning model to generate comprehensive spike explanations.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

Advantages of the Present Disclosure

The spike analysis methods and systems in the present disclosure leverage the capabilities of Large Language Models (LLMs), such as those of the GPT family, to overcome the shortcomings of existing methods. By analyzing representative documents correlated with identified driving factors of spikes, this approach enables the generation of detailed, contextually informed explanations for spikes. Unlike traditional methods or systems that focus narrowly on numerical data, the use of LLMs facilitates a multidimensional analysis, incorporating a wide array of unstructured text. In addition, some variants of the disclosed methods and systems also add the user query intent in the form of a list of themes, which, in some embodiments are extracted from an article or other text by means of LLM-interrogation. Some embodiments also add user context such as, for example, the company or institution at which the user works and some contextual data regarding this company or institution. This all not only enhances the explanatory depth and accuracy but also improves the accessibility of explanations, making them more understandable and actionable for users across various domains.

Consequently, this disclosure represents a significant advancement over existing methods or systems, offering a more holistic and nuanced understanding of the dynamics underlying data spikes, particularly by efficiently analyzing and integrating insights from vast documents to contextualize and explain these occurrences.

BRIEF DESCRIPTION OF THE DRAWINGS

The accompanying drawings illustrate embodiments and/ or aspects of the disclosure and, together with the written description, serve to explain the principles of the disclosure. Wherever possible, the same reference numbers are used throughout the drawings to refer to the same or like elements of an embodiment, and wherein:

FIG. 4 illustrates examples of spike explanations generated by a system in accordance with an example of the present disclosure.

DETAILED DESCRIPTION

Figure 1:
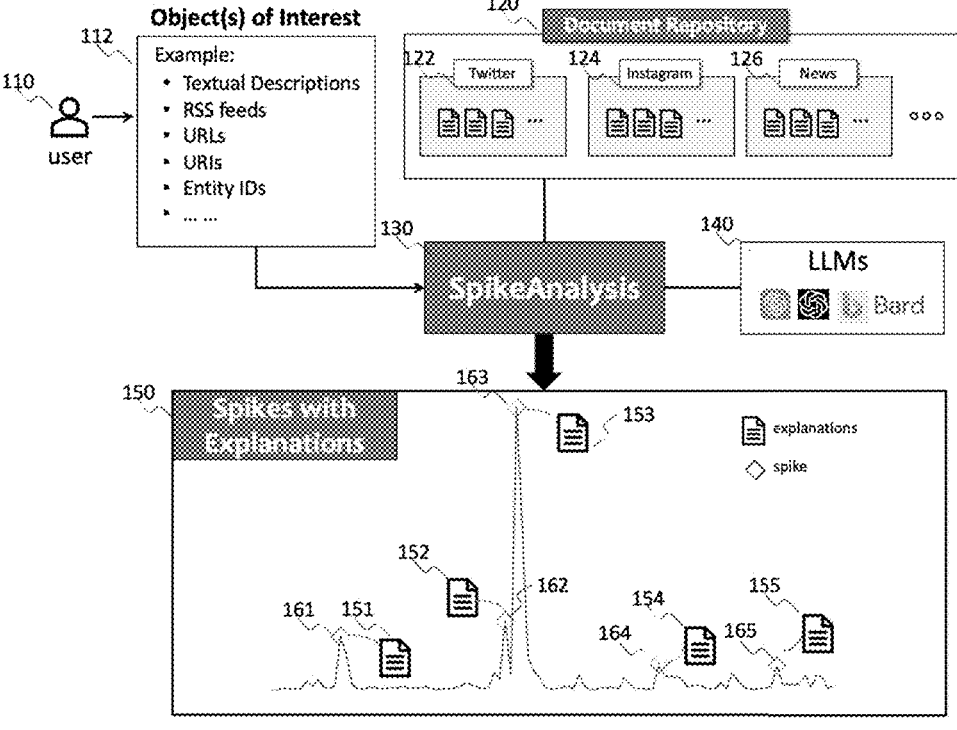
FIG. 1 provides an illustrative schematic diagram consistent with the present disclosure.
Figure 2:
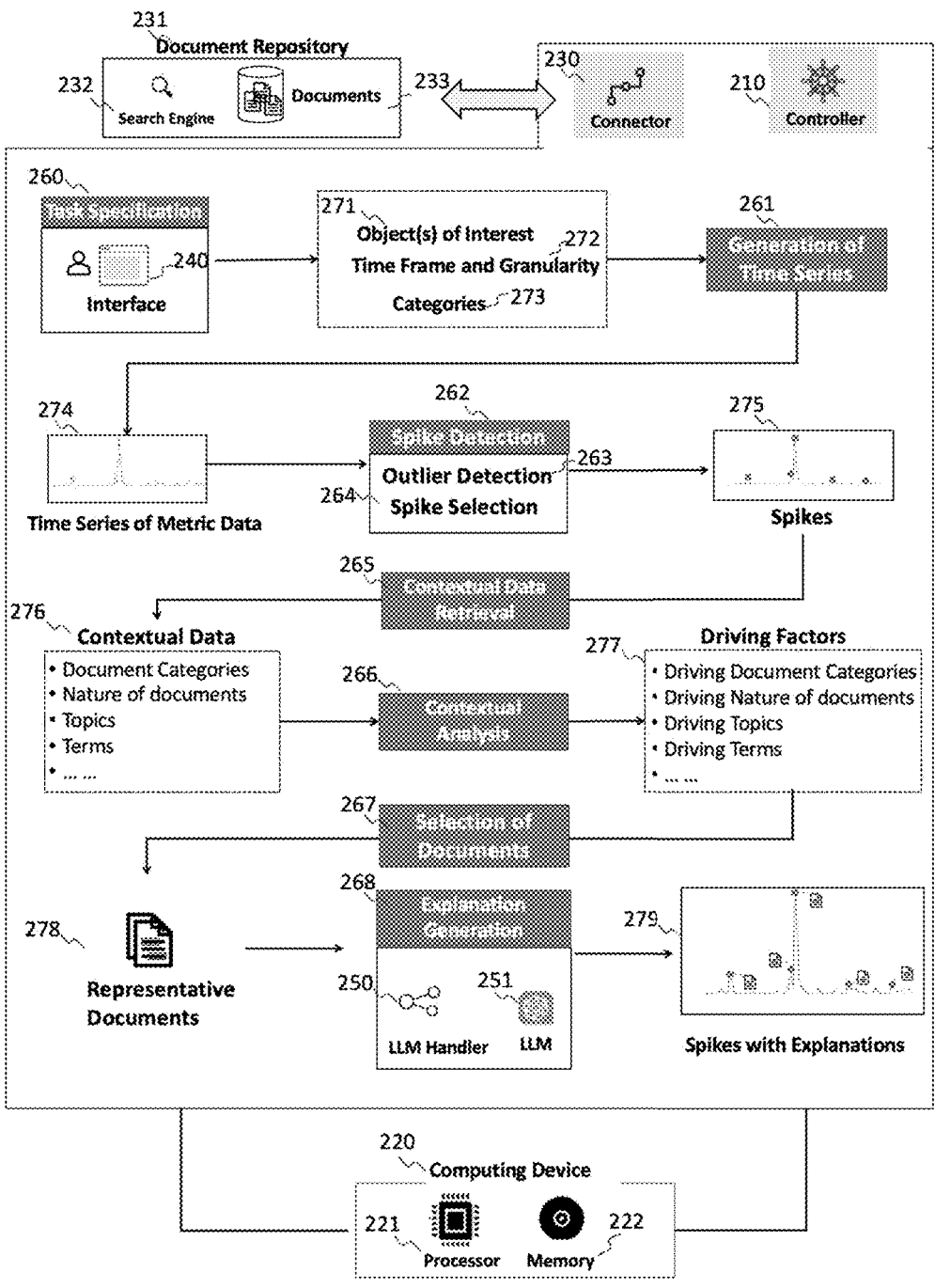
FIG. 2 shows outline illustrations of a system according to an example of the present disclosure.

The present disclosure is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present disclosure, as the disclosure encompasses other embodiments not specifically recited in this description, including alternatives, modifications, and equivalents within the spirit and scope of the disclosure. Further, the use of the terms "disclosure," "present disclosure," "embodiment," and similar terms throughout the description are used broadly and not intended to mean that the disclosure requires, or is limited to, any particular aspect being described or that such description is the only manner in which the disclosure may be made or used. Additionally, the disclosure may be described in the context of specific applications; however, the disclosure may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the disclosure. Thus, it is apparent that the present disclosure can be carried out in a variety of ways, and does not require any of the specific features described herein. Also, well-known functions or constructions are not described in detail since they would obscure the disclosure with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the disclosure, since the scope of the disclosure is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Ranges are used herein shorthand so as to avoid having to list and describe each and every value within the range. Any appropriate value within the range can be selected, where appropriate, as the upper value, lower value, or the terminus of the range.

Unless indicated to the contrary, numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise", "comprises", and "comprising" are to be interpreted inclusively rather than exclusively. Likewise the terms "include", "including" and "or" should all be construed to be inclusive, unless such a construction is clearly prohibited from the context. The terms "comprising" or "including" are intended to include embodiments encompassed by the terms "consisting essentially of" and "consisting of". Similarly, the term "consisting essentially of" is intended to include embodiments encompassed by the term "consisting of". Although having distinct meanings, the terms "comprising", "having", "containing" and "consisting of" may be replaced with one another throughout the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

"Typically" or "optionally" means that the subsequently described event or circumstance may or may not occur, and that the description includes instances where said event or circumstance occurs and instances where it does not.

Wherever the phrase "for example," "such as," "including," and the like are used herein, the phrase "and without limitation" is understood to follow unless explicitly stated otherwise.

Generally, embodiments of the present disclosure are directed towards thermally conductive materials, including, as non-limiting examples.

Concepts and Terminology

This section is dedicated to introducing the fundamental concepts and terminology employed throughout the current description. It is essential to note that the definitions and descriptions provided herein are not intended to restrict the scope of the present disclosure. Rather, they serve to provide a comprehensive understanding of the terms utilized. The concepts elucidated in this section do not reference any specific embodiment of this disclosure but are instead employed as a foundational background.

An exemplary embodiment and variants thereof implementing the SpikeAnalysis system in accordance with the present disclosure also serves as the basis for introducing the SpikeAnalysis method, providing a concrete illustration of its application and effectiveness.

Types of Users

In the current context, a 'user' of the SpikeAnalysis system encompasses a broad range of entities. This includes human users who engage with the system via its visual user interface, as well as programs that interact with the system in various ways, such as through the Application Programming Interface (API) provided by the system, or by incorporating SpikeAnalysis as a dependency tool in their own software environments.

Object(s) of Interest

A 'user' of the SpikeAnalysis designates the object(s) of interest for which the spike analysis process is to be executed. In this specification, the term 'object' is used in its broadest sense, encompassing any entity or concept that can be distinctly articulated by the user. The specification of an object includes, but is not limited to, representations such as words, nouns, or noun phrases in a natural language or a natural language extension, identifiers such as RSS feeds, URIs, URLs, entity IDs within a knowledge graph, and so on. Moreover, a user can make object specifications that combine multiple objects via Boolean formulas, for example "(IBM or Apple) and not fruit".

Document Repository

The term 'document repository' shall be interpreted to its broadest possible extent throughout the descriptions herein. In various embodiments, it may include one system or a plurality or combination or an integration of basic systems or systems enriched or annotated by contextual information, from a group of systems comprising: (a) social networks, (b) databases or searchable archives obtained from social networks, (c) searchable blogs, (d) news archives, where the news may stem from newspapers or other news sources, (e) E-mail archives, (f) publication archives, (g) proprietary document archives, (h) the World Wide Web, or parts thereof, (i) document management systems, (j) an intranet or a federation of intranets, (k) electronically searchable document or library catalogs with links to online documents or to electronically stored documents, (l) full-text databases, (m) databases that store text fields and that can retrieve texts via a suitable query language, (n) searchable content management systems, (o) image repositories retrievable by image search facilities retrieving images from documents, (p) log management systems, (q) machine learning models that have been trained on relevant documents and can be used to retrieve necessary information, (r) vector databases that store multidimensional arrays representing documents and is capable of efficiently executing proximity or similarity searches to identify related content based on vector distances, and (s) data lakes that aggregate a vast and varied collection of raw data, including structured, semi-structured, and unstructured data, in its native format, and provide sophisticated search and retrieval capabilities to extract valuable insights from the amassed information.

The basic textual or pictorial content elements of the document repository are here referred to as "documents". As an example, it is possible to assume that document publication timestamps and other contextual data related to the documents are available. Furthermore, it is assumed that the documents can be searched for mentions of objects of interest and for contextual data associated with documents and/or mentions, and that the documents, the mentions, and the contextual data of documents and/or mentions can be retrieved, and statistical aggregation information comprising metric information and contextual data statistics is retrievable by search mechanisms that are part of the document-repository software and/or are computable by external search mechanisms that access the document repository.

Metadata Associated with Documents

The documents of the document repository usually carry the following retrievable metadata: (i) a unique identifier locating the document in the document repository; (ii) the origin of the document, possibly at various levels of precision; (iii) the title of the document; (iv) a summary of the document, such as a snippet or associated keywords of the document; (v) a timestamp, usually reflecting the publication date of the document, where, for different documents or document classes, timestamps may be given at different levels of granularity or precision, such as week, day, hour, minute, and so on; and (vi) other useful information such as the author of the document, its country or place of creation and/or publication, keywords, and so on.

Note: In an embodiment described further below, search results comprise all the information described by the above four points (i)-(iv). In other embodiments, part of the information may be missing, for example, the summary may be missing. This means that, instead of using the summary, the full text of the document will be used, or that a summary of this text would be produced separately, outside (and usually after) the search.

The document repository is to be searchable. The search functionality may be provided by the underlying system or systems used to store the document repository. In case the document repository consists of a plurality or a combination or an integration of subsystems, its search functionality may consist of the plurality of the search functionalities of these subsystems (in which case each subsystem may be searched independently by search functionalities that may differ from those of other subsystems) or of a combination or integration of these search functionalities. Moreover, the search functionality of the document repository may also be provided by some external search tool or by code developed on purpose to meet the requirements of a spike analysis system.

The search functionality may support various types of searches, including, but not limited to: exact search, which locates matches that are identical to the query; fuzzy search, which identifies matches with a high degree of similarity to the query despite minor differences; and semantic search, which interprets the meaning of the query to find contextually relevant results.

In the context of this disclosure, the search functionality also allows for searching documents according to their metadata values. For example, it provides searching documents with a particular timestamp, or for documents whose time stamp lies in a particular given time interval. Moreover, statistical searches can be performed, for example, searches that return the number of all documents having given metadata-properties whose time stamp lies in a certain interval. To answer such statistical queries, it is usually not necessary to retrieve and/or inspect the documents proper. All relevant information can be searched contained in a search result is easily accessible by other procedures, and the search results can be analysed and counted without inspecting the matched documents.

Source-Based Categorization of Documents

Each document stored in the document repository used should be linked to a specific category reflective of its original publication medium. In some embodiments, it is usually a system administrator who defines and modifies the set of possible categories. In more sophisticated embodiments, this is done automatically either by direct machine-learning and/or clusterization methods or with help of LLMs.

The methodology for categorizing document sources includes, but is not limited to, the following approaches:

1. Origin-Based Categorization: In this approach, each unique origin of the documents serves as a separate category. For instance, documents originating from X (a.k.a. Twitter) would constitute one category, while those from Facebook would form another.

2. Type-Based Categorization: Documents are grouped based on the nature or type of their original sources. For example, documents on social media platforms like X (Twitter) and Facebook may be aggregated under a 'Social Network' category.

3. Hybrid Categorization: This strategy merges the principles of the preceding two methods. It allows for a versatile approach where some documents are categorized by their specific origin—for instance, tweets may be classified under an 'X' '(or equivalently 'Twitter') category—while others are grouped according to the type of their original sources, like grouping various news articles under a 'News' category.

Document source categories can be tailored using these categorization methods, and can be expanded as new sources emerge.

Mentions

The spike analysis process described in this disclosure relies fundamentally on the mentions of the object(s) of interest. Within the context of this specification, a 'mention' of an object encompasses both explicit and implicit references to the object. An explicit mention in a document is defined as the presence of the object's descriptive phrase or identifier. In the context where the document repository employed is a Social Network, mentions of objects of interest such as a post, may encompass diverse engagements with this post, including but not limited to comments on the post, shares of the post, likes of the post, and other interactions. On the other hand, an implicit mention refers to indirect references or associations with the object. This may include, but is not limited to, the use of synonyms, related terms, or contextual clues within the text that suggest the presence or relevance of the object without directly naming it. Implicit mentions might also arise from semantic analysis that connects the content of the document to the object of interest in an indirect way.

Contextual Data of Mentions

Within the SpikeAnalysis system, each mention of the object of interest is augmented with contextual data. The contextual data of a mention comprise contextual data of the document repository directly associated with the mention (for example, the context of the mention or a side-note next to the mention) and/or associated with the document in which the mention occurs or with some higher granularity object containing the document. For example, imagine a newspaper that contains an article which, in turn contains a mention. Assume that with each newspaper title, the country of its publication is stored. Obviously, this is then also the country of publication of the article and thus of the mention. Contextual data of lower granularity objects such as mentions can thus be inherited from higher granularity objects containing the lower granularity object. This contextual data varies based on the mention's document source category and can provide a multifaceted understanding of each mention. The types of contextual data associated with a mention may comprise, but are not limited to:

1. category of the document containing the mention,
2. nature of the document containing the mention, such as whether a document in the category of "X" (or equivalently 'Twitter') is a retweet, comment, quote, or reply,
3. topics covered in the document containing the mention,
4. associated terms, such as hashtags or labels associated with the document containing the mention, or entities co-occurring with the object of interest in its mentions,
5. publication location data, i.e., the geographical location where the document containing the mention was originally published,
6. event location data, comprising a geographical location where a reported event took place, takes place, or shall take place (this information is sometimes explicitly given, for example, when an article starts with a city or country name such as: "Paris. The 28th cigar tasting meeting of Savoir Vivre society was held yesterday in the Hôtel de la Païva . . . ", otherwise it is obtained from a text or article, in some embodiments by traditional NLP methods and in others via automated LLM-interrogation),
7. keywords of the mention's context (e.g. of the paragraph in which the mention occurs),
8. degree of prominence of the position where the mention is made within a document (e.g. headline, subtitle, close to the beginning, close to the end).

This contextual data framework ensures that each mention is not merely a standalone piece of data but is instead understood within its broader context.

Metrics

In the context of this disclosure, the word 'metric(s)' refers to the quantitative indicator(s) utilized to measure and analyze the spike or significant variations in data trends. These metrics are critical in identifying and interpreting the spikes within the document repository. Examples of such metrics include, but are not limited to:

1. Number of Mentions: This metric tracks the occurrences or references of the specified object(s) of interest within a document repository. A spike in the number of mentions can indicate a sudden increase in interest or relevance of the object.
2. Sentiment Scores: This metric evaluates the emotional tone or sentiment associated with the mentions of the object(s) of interest. For example, the sentiment score for an object of interest can be calculated using the formula $(p-v)/(p+v)$, where p denotes the number of positive sentiment mentions, and v denotes the number of negative sentiment mentions. This formula is applicable when there is at least one positive or one negative mention. In instances where all mentions are neutral, the score defaults to 0. This is just an example. Various embodiments of the present disclosure may employ different methods for sentiment calculation. A spike in sentiment scores can signify a significant shift in public perception or mood related to the object.

Different embodiments of this disclosure may adopt different metrics. Further metrics may also be employed to provide a multi-dimensional analysis of data spikes. The SpikeAnalysis system is designed to be adaptable to incorporate additional or alternative metrics as required by specific applications or as developed in the field.

An Exemplary Embodiment

In this section, we describe an exemplary embodiment of the present disclosure. FIG. 1 presents an illustrative diagram corresponding to this particular embodiment. The SpikeAnalysis system 130 is connected with a document repository 120, which is organized into a series of predefined categories based on document sources, each containing relevant documents. For instance, the "X" (or equivalently 'Twitter') 122 category might include tweets, comments, and replies, while the 'News' 126 category encompasses a collection of news articles aggregated from the Web.

In certain embodiments, the document repository is integrated within the SpikeAnalysis system. In other embodiments, the document repository, such as a Social Network, exists externally to the SpikeAnalysis system and can be accessed via a connector 230, such as one utilizing the data API provided by the Social Network.

Users engage with SpikeAnalysis by specifying their object(s) of interest. In response, SpikeAnalysis conducts a detailed analysis of statistics of mentions related to these objects to identify any significant spikes in activity or interest. SpikeAnalysis utilizes Large Language Models (LLMs) 140 like GPT for generating insightful explanations. This is achieved by feeding carefully selected representative documents into the LLMs, which then process and interpret the documents to produce coherent and contextually relevant explanations. The output of SpikeAnalysis is a comprehensive report 150 of detected spikes 161 162 163 164 165, each accompanied by its respective explanation 151 152 153 154 155, thereby offering users not just spikes, but understanding and context.

In this exemplary embodiment, the operation of the SpikeAnalysis system necessitates a minimum of one Computing Device 220. The Computing Device includes, but is not limited to, at least one processor 221 and a non-transitory computer-readable memory 222. The processor is specifically configured to execute software instructions or programs that are stored in the memory. Additionally, the computing device is required to maintain a physical or network-based connection with a Document Repository 231. The Document Repository is a dedicated storage medium that houses documents essential for conducting spike analysis. This connection ensures the system's access to relevant documents within the repository for effective spike analysis execution.

Components

All the main software components of the system are orchestrated by an implemented control mechanism, referred to as "controller" 210. The controller determines the order of the task execution of various main software components. Each of these main software components can be invoked by, and exchange data with the controller and other components. A controller can do some tasks by itself, such as main I/O, maintenance of documents and data, and so on. In this embodiment, the SpikeAnalysis system consists of the main software components listed below.

1. Document Repository Connector 230: This component establishes and manages read/write interactions with the SpikeAnalysis's document repository 231. It is designed to leverage the search functionalities of the document search engine 232 (e.g., ElasticSearch) to execute a range of tasks. These tasks include locating relevant documents within all documents 233 and performing statistical calculations or analyses on the stored documents.

Figure 3:
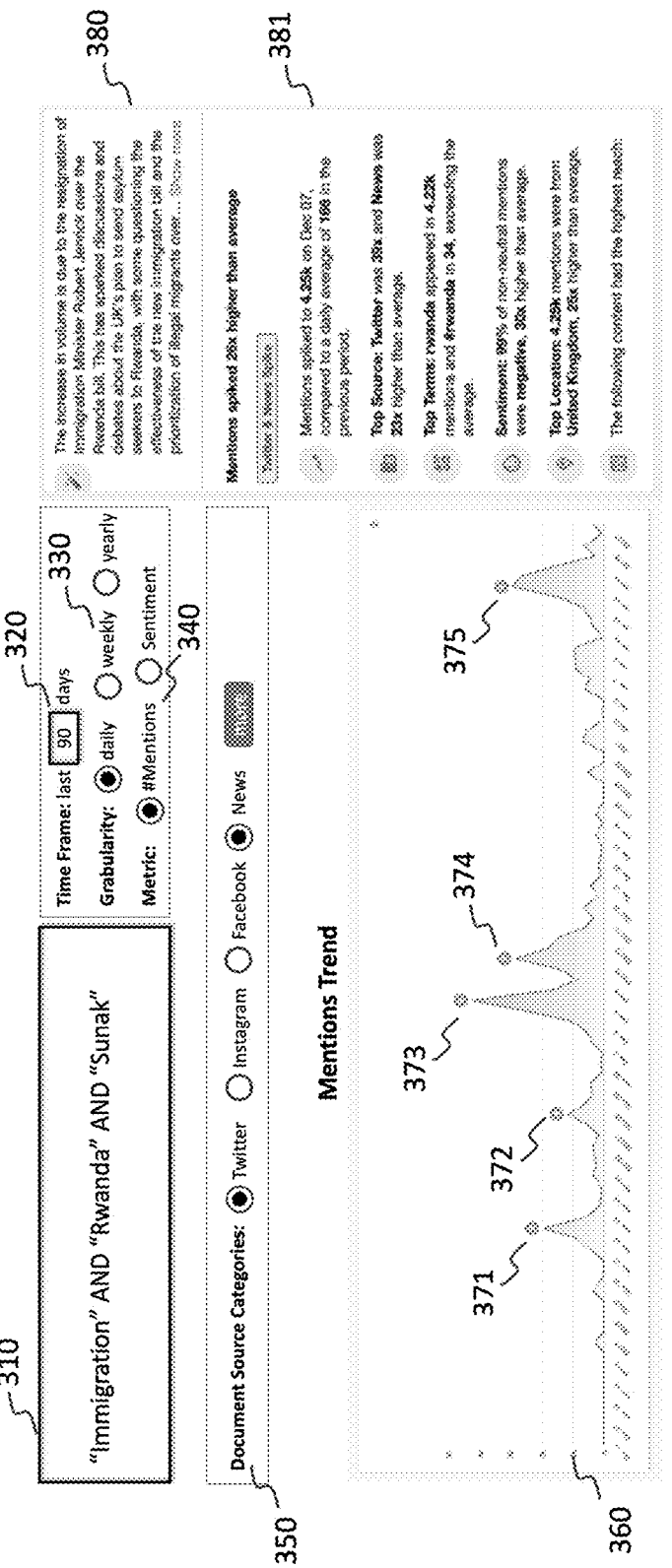
FIG. 3 depicts a screenshot of the User Interface (UI) of a system according to an example of the present disclosure.

2. User Interface 240: This component is implemented as a Web application, which can be accessed via its URL. FIG. 3 showcases a screenshot exemplifying such a user interface. It equips the user with an input field 310, to specify the object(s) of interest, and enables the specification of a desired time frame 320; the granularity of the time series 330; the selection of a metric 340; and the choice of document source categories 350. Additionally, it displays the generated time series 360, which includes the detected spikes (371, 372, 373, 374, 375), and allows the user to interact with each spike to view the corresponding spike explanation 380, along with the statistics of driving factors 381. In other embodiments, the user interface may contain more functions and may allow a richer set of user interactions, and instead of a Web application, the user interface can also be part of a software that may be incorporated into a local client and runs locally.

3. LLM Handler 250, which can transmit prompts to LLMs like GPT 251 and receive responses. The implementation of this component can be achieved by utilizing various techniques, such as: leveraging API calls to interact with a pre-existing LLM service or platform, developing a custom interface that establishes communication with the LLMs through appropriate protocols or libraries, utilizing language model frameworks or libraries that provide built-in functionality for prompt handling and response retrieval. The specific implementation approach may vary depending on the chosen LLM and the programming language used in the system.

Example Workflow

In the current embodiment, the workflow of the SpikeAnalysis system is structured into the following main steps: 1. Task Specification 260, 2. Generation of Time Series 261, 3. Spike Detection 262, 4. Contextual Data Retrieval 265 and Analysis 266, 5. Selection of Representative Documents 267, and 6. Explanation Generation 268, which will be described in the subsequent subsections.

I. Task Specification 260

In this embodiment, SpikeAnalysis presents a visual User Interface 240 allowing the user to define their 'object(s) of interest' 271 as described in the Object(s) of Interest section. A human user may input key phrases into the search term field 310 on the UI to describe the object(s) of interest. Additionally, certain embodiments of SpikeAnalysis may offer a predetermined list of objects for user selection. In alternative embodiments, as detailed in the Object(s) of Interest section, SpikeAnalysis accommodates various formats for specifying the 'object(s) of interest'.

In scenarios where a visual User Interface is unnecessary, such as instances where the user is a program rather than a human (as discussed in the section of Types of Users), interaction with SpikeAnalysis is facilitated through an Application Programming Interface (API). In these cases, the 'object(s) of interest' is specified directly within the payload of the API request. In scenarios where the user is a program, the 'object(s) of interest' may be dynamically generated and provided by these programs themselves.

Beyond designating the 'object(s) of interest', users are allowed to specify a particular time frame 320 and granularity 330 (e.g., daily) 272 for conducting spike analysis. In the absence of specific user inputs, the system automatically defaults to a predefined standard period, typically set to 90 days, and establishes the granularity of the time series at a daily level. Users also have the option to select the metric 340, which defaults to the number of mentions of the object(s) of interest.

Finally, users may select 273 from the document categories (outlined in the 'Source-based Categorization of Documents' section) displayed on the UI 350. Should users not specify their preferences, SpikeAnalysis defaults to a predefined set of categories.

Each of these features described above collectively enhances the adaptability and functionality of the SpikeAnalysis, catering to diverse user needs and scenarios.

II. Generation of Time Series 261

Upon receiving the task specification, SpikeAnalysis initiates the process by generating a sequence of timestamps $T=[t_1, \ldots, t_n]$ that align with the specified time frame and granularity, all standardized to the same time zone. In this particular embodiment, the timestamp list T is required to be uniformly spaced with a daily granularity and must contain no fewer than seven timestamps. Uniform spacing necessitates that all daily timestamps occur at the same hour each day, referred to as the pivot hour. Nevertheless, due to factors such as daylight savings, timestamps generated using a specific pivot hour may exhibit irregular spacing, for instance, differing by an hour. To rectify this, a timestamp sanitization procedure is executed. This process involves shifting the pivot hour so that all timestamps are evenly spaced.

Subsequently, the Document Repository Connector 230 engages with the document repository 231 to execute queries aimed at retrieving metric data, such as number of mentions, pertaining to mentions of the 'object(s) of interest' at each timestamp within the designated time frame.

In this particular embodiment, the metric data consists of the count of mentions of the 'object(s) of interest' sourced from the documents in those categories specified in the preceding step. The quantification of these mentions is conducted by the document search engine 232, as elaborated in the 'Document Repository' section. However, it is important to note that this embodiment is not restrictive. In alternative embodiments, a diverse array of metric data, as discussed in the 'Metrics' section, may be employed to suit different analytical needs or to provide more nuanced insights into the data trends. In addition, obtaining metric data may require extra computation steps. For instance, certain embodiments may employ Sentiment Scores (as detailed in the 'Metrics' section) as the metric. To generate sentiment scores for mentions of the object(s) of interest, the SpikeAnalysis system may initially retrieve pertinent mentions from the document repository and subsequently conduct a sentiment analysis process to produce the sentiment scores.

Given the object of interest e, and a list of n timestamps $T=[t_1, \ldots, t_n]$ standardized to the same time zone, the system constructs a time series $\mathcal{M}=[m_1, \ldots, m_n]$ 274. This series is a compilation of metric data where each element $m_i$ (for $1 \le i \le n$) corresponds to the metric data related to mentions of e at the specific timestamp $t_i$.

III. Spike Detection 262

In this embodiment, an 'outlier' is defined as a data point that significantly deviates from the established norm, representing an abnormal or atypical value within the dataset. A 'spike' is characterized as the most pronounced outlier within a locally contiguous sequence of outliers, typically representing a sharp, distinct increase in the metric value.

To effectively identify these critical data points, the Spike Detection process is systematically divided into two main sub-steps:

Outlier Detection 263: This sub-step involves the computational identification of all outliers within the sequence of metric data corresponding to different timestamps.

Spike Selection 264: Subsequent to identifying outliers, this sub-step focuses on isolating spikes from the pool of outliers.

The Outlier Detection 263 process accepts the series of metric data $\mathcal{M}$ as its input and is tasked with identifying all outliers within $\mathcal{M}$. To ensure comprehensive and robust detection, this process utilizes three distinct algorithms, each renowned for its efficacy and delineated within the literature. The details of these algorithms are as follows:

1. Static Z-score: This algorithm employs the median of $\mathcal{M}$ as a central tendency measure and the Median Absolute Deviation (MAD) as a dispersion measure. An outlier is defined as any data point in $\mathcal{M}$ that deviates from the median by more than 4.5×MAD. This fixed threshold provides a consistent, static baseline for identifying outliers, making it robust against varied data distributions.

2. Generalized Extreme Studentized Deviate (G-ESD): The G-ESD algorithm iteratively identifies and assesses the most significant outliers. In each iteration up to a predefined k, it locates the point V with the maximum deviation from the dataset's mean and evaluates its significance using the t-distribution. After each iteration, the identified outlier V is excluded from subsequent analysis, allowing for a stepwise refinement of the dataset.

3. Hybrid Extreme Studentized Deviate (H-ESD): Building upon the G-ESD methodology, the H-ESD algorithm introduces a crucial adaptation: it calculates the test statistics using the median and MAD instead of the mean and standard deviation. This modification aims to enhance the test's robustness by reducing the influence of existing outliers on the calculation, thus providing a more accurate identification of true outliers.

The process of Outlier Detection is outlined in Algorithm 1. This algorithm is designed to intake a list of metric data, symbolized as $\mathcal{M}$, and systematically identify outliers within this dataset. The output of this algorithm is a set of detected outliers, represented by their respective indexes within $\mathcal{M}$.

```
Algorithm 1 DetectOutlier(M): detect outliers in a list of metric data.
Input: M -- a list of metric data.
Return: outliers detected within M, represented by
        their respective indexes within M.
if M.size < 21: // 21 is empirically set
    return Z-score (M);
else:
    if M is seasonal:
        return G-ESD(M);          // More conservative detection
    else if M has trend:
        return H-ESD(M);          // Relax detection for level shifts
    else:
        return H-ESD(M);          // For long-tail distributions
```

The rationale for the algorithm's steps is as follows:

When the size of $\mathcal{M}$ is less than 21, the Z-score method is utilized. This statistical measure is effective for smaller datasets where the likelihood of complex patterns is reduced. A threshold of 21 is selected, aligning with established precedents in the literature.

For datasets exhibiting seasonal patterns, the Generalized Extreme Studentized Deviate (G-ESD) test is employed. This method is more conservative in detecting outliers, which is essential for seasonal data to avoid wrongly classifying a seasonal effect as an outlier.

In cases where $\mathcal{M}$ presents a trend, the Hybrid Extreme Studentized Deviate (H-ESD) test is applied. This test is an adaptation of the G-ESD method that uses the median and Median Absolute Deviation (MAD) instead of the mean and standard deviation. This adjustment makes H-ESD more suitable for datasets with trends because the median and MAD are more robust to outliers, thereby providing a more accurate identification of genuine anomalies.

The H-ESD method is also recommended for time series without seasonal patterns and trends (often long-tailed distributions). In such scenarios, the robustness of H-ESD against outliers helps in correctly identifying them without being influenced by the extreme values typical of long-tailed distributions.

Given that not all detected outliers necessarily correspond to spikes, the subsequent step involves the Spike Selection process, which is outlined in Algorithm 2.

```
Algorithm 2 SelectSpike(M, O): select spikes from a list of outliers.
Input:      M --      a list of metric data from which the outliers
                      have been detected.
            O --      a list of outliers, represented by their
                      repective indexes in M.
Return: Spikes selected from the list of outliers in M, represented
        by their repective indexes in M.
// The outlier is considered a spike if there's a positive slope leading
// up to it and a negative slope descending from it.
for each outlier_index in O:
    if outlier_index == 1 or outlier_index == M. size:
        // Skip the first and last data point;
        // not enough data for slope calculation.
        continue
    // Calculate slopes
    slope_to_outlier = M[outlier_index] – M[outlier_index – 1]
    slope_from_outlier = M[outlier_index + 1] – M[outlier_index]
    // Check if the current outlier is a spike
    if slope_to_outlier > 0 and slope_from_outlier < 0:
        // This is a spike; add to the list of detected spikes
        spikes.append(outlier_index)
return spikes
```

The SelectSpike algorithm is designed to identify spikes from a given list of outliers within a metric data series. It takes two inputs: the original metric data, $\mathcal{M}$, and $\mathcal{O}$, the list of outliers represented by their respective indexes in $\mathcal{M}$. The core idea is to differentiate spikes from other outliers by examining the slopes leading up to and descending from each outlier. A spike is characterized by an increasing trend immediately before it (a positive slope) and a decreasing trend immediately after (a negative slope). The algorithm iteratively examines each outlier and calculates the slopes to and from it. Outliers that meet the spike criteria are then recorded as spikes 275.

In alternative embodiments, the definitions of outliers and spikes, as well as the methodologies for their identification, may diverge from those specified in this particular embodiment. Consequently, the algorithms employed to detect outliers and spikes would be accordingly adapted to align with these alternate definitions and requirements. This flexibility allows the system to be tailored to various contexts and datasets, ensuring its applicability and effectiveness across a range of scenarios.

IV. Context Data Retrieval 265 and Analysis 266

For each identified spike located at the i-th position of $\mathcal{M}$, corresponding to a spike occurring at timestamp $t_i$, the system retrieves 265 the pertinent contextual information of mentions contributing to the spike. This data is sourced from the document repository 231 through the Document Repository Connector 230. Subsequent analysis is then conducted to elucidate the factors significantly contributing to the spike, providing a deeper understanding of its underlying causes and implications.

In this embodiment, the contextual information pertaining to a mention of the object(s) of interest is characterized by several distinct factors, each contributing to a comprehensive understanding of the mention's context. These factors include:

1. document category of the document containing the mention,
2. nature of the document containing the mention, such as whether a document in the category of 'X' (or equivalently 'Twitter') is a retweet, comment, quote, or reply,
3. topics covered in the document containing the mention,
4. associated terms, such as hashtags or labels associated with the document containing the mention,
5. publication location data, i.e., the geographical location where the document containing the mention was originally published.

While this embodiment considers a comprehensive set of contextual information types, in simpler embodiments, only a subset of these factors may be considered. Conversely, in more complex embodiments, additional types of factors might be included to provide an even more nuanced understanding of the mention's context. Different set of types of factors may be used in various embodiments.

Subsequent subsections detail the processes utilized to ascertain the driving factors associated with each of the contextual information types listed above. While the current embodiment employs specific methodologies and thresholds for identifying these driving factors, it is important to recognize the flexibility inherent in the system's design. Alternative embodiments may implement different methods or vary the thresholds used to discern these driving factors, allowing the system to be tailored to different data sets, objectives, or operational contexts.

Detecting Driving Document Categories As described in the Source-based Categorization of Documents section, documents featuring mentions of the object(s) of interest may belong to various categories, such as 'X' (or equivalently 'Twitter') or 'News'. To ascertain which category has predominantly contributed to a detected spike, the system employs a dedicated algorithm, outlined as follows: Initially, the algorithm calculates several key statistics for each category, corresponding to the spike day, i.e., the specific day when the spike is identified. These statistics include: the proportion of mentions for each category on the spike day, the absolute volume of mentions from each category on the spike day, the average volume of mentions preceding the spike day, and the relative growth in mentions compared to this average. Special attention is given to avoid division by zero in cases where the average volume is zero. After these computations, the algorithm evaluates each category against a set of stringent criteria. A category is deemed a potential driving factor of the spike if it accounts for at least 10% of the total mentions on the spike day, boasts a minimum of 10 mentions, and exhibits more than 30% growth relative to the average volume before the spike day (provided the average is above zero). Should no source satisfactorily meet all these conditions, the algorithm defaults to selecting the category with the highest volume of mentions on the spike day. The final step involves sorting the potential driving categories by their absolute volume on the spike day and relative growth percentage. The top categories are then identified as the primary driving categories behind the volume spike.

Detecting Driving Discussion Types For categories that are fundamentally social networks, such as X (a.k.a. Twitter), a multitude of discussion types may mention the 'object of interest.' These can include original tweets or posts, retweets, quotes, replies, comments, among others. This stage of the algorithm is dedicated to calculating and analyzing the statistics of these distinct types of discussions. It then determines which particular type or types of discussions have predominantly contributed to the spike. To achieve this, a process that is similar to the process of detecting the driving document categories but with some adaption is used. Specifically, a discussion type must account for at least 20% of the total mentions within the source volume on the spike day and have a minimum occurrence of 10 mentions. Furthermore, the discussion type should exhibit a relative increase in mentions exceeding 30% when compared to its average mention volume prior to the spike day; this condition is applicable only if the average is a non-zero value. In instances where no discussion type fulfills these criteria, the process is designed to default to the discussion type that registers the highest volume of mentions on the spike day. The outcome of the process is the identification of the discussion type(s) that most significantly contribute to the spike, alongside a quantification of its absolute volume on the spike day and the relative growth observed.

Detecting Driving Topic Various mentions of the object(s) of interest may encompass a diverse array of topics, as explained in the Mentions section. To analyze which specific topic is most closely correlated with a detected spike, the system employs an approach outlined in Algorithm 3. In algorithm 3, the function oom(n) calculates the magnitude of some number n, and is defined as oom(n)=floor(log 10(n)).

```
Algorithm 3: IdentifyDrivingTopic(topics, N, TM):
              determine the topic driving a specific spike.
Input:
    topics -- a list of topics.
    N -- the number of total mentions of the object of interest
         on the spike day.
    TM -- a list consisting of the numbers of mentions of each
          topic on the spike day.
Return:
    The driving topic, and its median mention number,
    its mention number on the spike day,
    the percentage change and the absolute change of its mention
    numbers.
// Sort all topics based on their mention counts on the spike day
    in a descending order.
sorted_topics = sort(topics, TM)
// for each topic in the sorted top 5 topics on the spike day:
for each topic tp in sorted_topics[:5]:
    median_mentions = median(mentions of tp on days before the
    spike day)
    absolute_change = TM[tp] – median_mentions
    if median_mentions > 0:
        percentage_change = absolute_change / median_mentions
    if TM[tp] > 0 AND TM[tp] > median_mentions AND
    (percentage_change >= 0.3
      OR (median_mentions == 0 AND absolute_change >= 50)
    ):
        if (topic.level == 1 AND
          ((oom(N) >= 4 AND oom(TM[tp]) >= (oom(N) – 1)) OR
          (oom(N) < 4 AND oom(TM[tp]) >= oom(N))))
          OR
          ((tp.level == 2 OR tp.level == 3)
```

-continued

```
                AND oom(TM[tp]) >= (oom(N) – 1)):
                return topic, median_mentions, TM[tp],
                    percentage_change, absolute_change
        return NULL // No driving topics can be found
```

The IdentifyDrivingTopic algorithm is designed to ascertain which topics are most influential in causing a specific spike. The algorithm processes a list of topics, each associated with their respective level as explained in the section of Mentions. The initial step involves sorting the topics by the volume of mentions on the spike day in a descending order, focusing on the top five topics to identify the one with the most significant impact. For each of these leading topics, the algorithm calculates the median of its mentions on days prior to the spike day and the changes in mentions on the spike day, both absolute and relative. The driving topic is determined based on a series of conditions that account for the topic's activity on the spike day, its growth compared to the median mentions, and its order of magnitude relative to the total mentions. The conditions are adjusted according to the hierarchical level of the topic, ensuring that the selected driving topic is not only statistically significant but also contextually relevant. If a driving topic is identified, the algorithm returns this topic along with its associated metrics. If no topic meets the criteria after evaluating the top five, the algorithm indicates this with a return value of NULL, signifying that no single topic was primarily responsible for the spike.

Detecting Driving Terms Terms that frequently co-occur with the object(s) of interest within mentions, or are otherwise associated with these mentions, can provide critical insights into the reasons behind a spike. In this embodiment, such terms could include hashtags, key phrases, or recognized entities. To analyze the significance and impact of these terms, the system employs a flexible method outlined in Algorithm 4. This algorithm determines which specific sub-processes, as detailed in Algorithms 5, 6, and 7, should be executed based on the driving document category.

```
Algorithm 4: IdentifyDrivingTerms(DC, S,
                        top5_hashtags,
                        top5_keyphrases, top5_entities):
                        determine the terms driving the spike.
Input:
    DC --   the top driving category.
    S --    the volume of mentions of the object(s) of interest
            contained in documents of the category DC on the spike day.
    top5_hashtags --    top five hashtags based on mention counts
                        on the spike day, sorted by mention counts
                        in descending order
    top5_keyphrases --  top five keyphrases based on mention counts
                        on the spike day, sorted by mention counts
                        in descending order
```

-continued

```
    top5_entities --    top five entities based on mention counts
                        on the spike day, sorted by mention counts
                        in descending order
Return:
    The driving term(s),
    their average mention counts before the spike day,
    their spike day mention count,
    and relative changes in mention count.
if DC is 'Twitter':
    Perform IdentifyDrivingHashtag(top5_hashtags, S)
        and IdentifyDrivingEntity(top5_entities, S)
else if DC is 'News':
    Perform IdentifyDrivingKeyPhrase(top5_keyphrases, S)
        and IdentifyDrivingEntity(top5_entities, S)
else:
    Perform IdentifyDrivingEntity(top5_entities, S)
// Algorithm 5 to retrieve the driving hashtag
Algorithm 5: IdentifyDrivingHashtag(top5_hashtags, S):
Input:
    top5_hashtags --    top five hashtags based on mention counts
                        on the spike day (.spike_day_count),
                        sorted by their mention counts on the spike day
                        in descending order
    S: --   the volume of mentions of the object(s) of interest
            contained in documents of the category DC (see Algorithm 4)
            on the spike day.
Return:
    the driving hashtag,
    its average mention count before the spike day,
    its spike day mention count,
    and relative changes in mention count.
for each hashtag in top5_hashtags:
    average = average(mentions of hashtag on days before the spike day)
    if hashtag.spike_day_count > 0
        and hashtag.spike_day_count > average:
        if average != 0:
            absolute_change = hashtag.spike_day_count – average
            percentage_change = absolute_change / average
        if (average == 0 or percentage_change > 0.3)
            and (oom(hashtag.spike_day_count) >= 1
            and oom(hashtag.spike_day_count) >= oom(S) –1):
            return hashtag, average,
                hashtag.spike_day_count,
                percentage_change, absolute_change
return NULL
```

Algorithm 5 iterates through the top five hashtags to identify which one is the primary driving hashtag of a spike. For each hashtag calculates the average number of mentions from days preceding the spike day, and compares it to its number of mentions on the spike day. If the latter is significantly higher than the average, and meet certain criteria for absolute and percentage change, as well as the order of magnitude (oom), that hashtag is returned as the driving hashtag. If none of the hashtags meet these conditions, the algorithm returns NULL, indicating no driving hashtag was found.

Similarly, the processes of identifying driving key phrases and key entities are described in Algorithm 6 and 7.

```
// Algorithm to retrieve the driving keyphrases
Algorithm 6: IdentifyDrivingKeyPhrase(top5_keyphrases, S):
Input:
    top5_keyphrases --          top five key phrases based on mention counts
                                on the spike day (.spike_day_count),
                                sorted by their mention counts on the spike day
                                in descending order
    S: --                       the volume of mentions of the object(s) of interest
                                contained in documents of the category DC (see Algorithm 4)
                                on the spike day.
Return:
    the driving key phrase,
    its average mention count before the spike day,
    its spike day mention count,
```

-continued

```
and relative changes in mention count.
for each phrase in top5_keyphrases:
    average = average(mentions of phrase on days before the spike day)
    if phrase.spike_day_count > 0 and phrase.spike_day_count > average:
        if average != 0:
            absolute_change = phrase.spike_day_count - average
            percentage_change = absolute_change / average
        if (average == 0 or percentage_change > 0.3)
            and (oom(phrase.spike_day_count) >= 1
            and oom(phrase.spike_day_count) >= oom(S) -1):
            return phrase, phrase.spike_day_count,
                    percentage_change, absolute_change
return NULL
// Algorithm to retrieve the driving entities
Algorithm 7: IdentifyDrivingEntity(top5_entities, S):
Input:
    top5_entities --               top five key entities based on mention counts
                                   on the spike day (.spike_day_count),
                                   sorted by their mention counts on the spike day
                                   in descending order
    S: --                          the volume of mentions of the object(s) of interest
                                   contained in documents of the category DC (see Algorithm 4)
                                   on the spike day.
Return:
    the driving entity,
    its average mention count before the spike day,
    its spike day mention count,
    and relative changes in mention count.
for each entity in top5_entities:
    average = average(mentions of entity on days before the spike day)
    if entity.spike_day_count > 0 and entity.spike_day_count > average:
        if average != 0:
            absolute_change = entity.spike_day_count - average
            percentage_change = absolute_change / average
        if (average == 0 or percentage_change > 0.3)
            and (oom(entity.spike_day_count) >= 1
            and oom(entity.spike_day_count) >= oom(S) -1):
            return entity, entity.spike_day_count,
                    percentage_change, absolute_change
return NULL
```

In certain embodiments, upon successful identification of both key driving phrases and driving entities, the system initiates an additional matching step to ascertain potential equivalences between driving key phrases and driving entities. In some embodiments, this step may involve standardizing the representations of key phrases and entities by stripping prefixes, suffixes, and special characters such as periods (".") and hyphens ('-'), followed by a fuzzy matching procedure. The pairs that exhibit a similarity ratio exceeding a predetermined threshold are then recognized as matching pairs. This illustrative method is one of many that various embodiments may employ. An alternative approach might leverage a sophisticated machine learning model, such as GPT, to assess and confirm the matching between a key phrase and an entity. In these embodiments, each pair of found matching driving key phrase and driving entity are combined as one driving term.

Detecting Driving Location In analyzing the factors influencing a spike, the geographical origins of the documents mentioning the object(s) of interest are of considerable significance. To ascertain which geographic locations have most substantially contributed to the spike in mentions, the system executes a method as delineated in Algorithm 8.

In the present embodiment, geographic locations are delineated at the country level, represented by corresponding sets of country codes. However, it is to be understood that this is just one example approach. Alternative embodiments may define locations with greater specificity, such as at the state level or city level, or may utilize different methodologies for geographic identification.

```
// Algorithm to retrieve the driving location
Algorithm 8: IdentifyDrivingLocation(top5_locations):
Input:
    top5_locations --     top five locations based
                          on counts of mentions from these locations
                          on the spike day (.spike_day_count),
                          sorted by their mention counts on the spike day
                          in descending order
Return:
    the driving location,
    its average mention count before the spike day,
    its spike day mention count,
    and relative changes in mention count.
for each location in top5_locations:
    average = average(counts of mentions from this location
                          on days before the spike day)
    if location.spike_day_count > 0
        and location.spike_day_count > average:
        if average != 0:
            absolute_change = entity.spike_day_count - average
            percentage_change = absolute_change / average
        return entity, entity.spike_day_count,
                percentage_change, absolute_change
return NULL
```

Algorithm 8 analyzes the top five locations, each quantified by the count of mentions of the object(s) of interest within these regions. It initiates by computing the historical average mention count for each location, aggregating data exclusively from the days prior to the spike day. This historical average is then used as a benchmark to evaluate the mention count on the spike day itself. A location is designated as the driving location if it exhibits a mention count that is non-zero and surpasses the historical average.

Should no location fulfill the predetermined criteria, the algorithm returns a NULL value.

V. Selection of Representative Documents 267

Upon the identification of driving factors in the preceding step, SpikeAnalysis next selects representative documents that contain mentions of the object(s) of interest, correlated with each of the identified driving factors. In this embodiment, the process of selecting representative documents for each identified driving factor depends on tailored selection metrics. These metrics vary based on the nature of the documents to be selected from, such as public articles, or social media contents.

Specifically, public articles, such as news articles, are evaluated based on their inter-linkages within other documents in the document repository. This evaluation metric is founded on the premise that the degree of connectivity, manifested through citations or references by other distinct documents, is indicative of a document's significance and its centrality to the discourse relevant to the driving factor. The assessment process quantifies this significance through a weighted score S for each article document d, computed as:

$$S(d) = \sum_{c \in C(d)} w_c$$

where C (d) represents the collection of other documents citing d, and $w_c$ denotes the weight attributed to each citing document c. The assignment of $w_c$ is determined by a distinct algorithm or methodology, which might, in its simplest form, assign a uniform weight to all documents. Similarly, for documents that are social media contents, the selection metric incorporates engagement indicators such as numbers of different actions performed on these documents. The score for a document d in this context is articulated as:

$$S^*(d) = \sum_{a \in A(d)} w_a \times \#a$$

Here, A(d) encompasses the array of engagement types accrued by d, including but not limited to comments, reactions, likes, shares, reposts, etc., while $w_a$ is the predetermined weight for each type of engagement, and #a is the count of actions of type a. This approach allows for a nuanced assessment of a document's impact and relevance through the lens of social interaction metrics.

In alternative embodiments, diverse methodologies for selecting representative documents may be adopted, each predicated on a distinct set of selection metrics.

VI. Use GPT to Generate Explanations 268

Up to this point in the process, each identified spike is associated with its underlying driving factors, accompanied by relevant statistics, such as percentage changes. Furthermore, representative documents that are directly correlated with each identified driving factor have been meticulously selected by the system. This association provides a comprehensive understanding of the dynamics influencing the spike, ensuring that the analysis is grounded in both quantitative data and contextual evidence.

Figure 5:
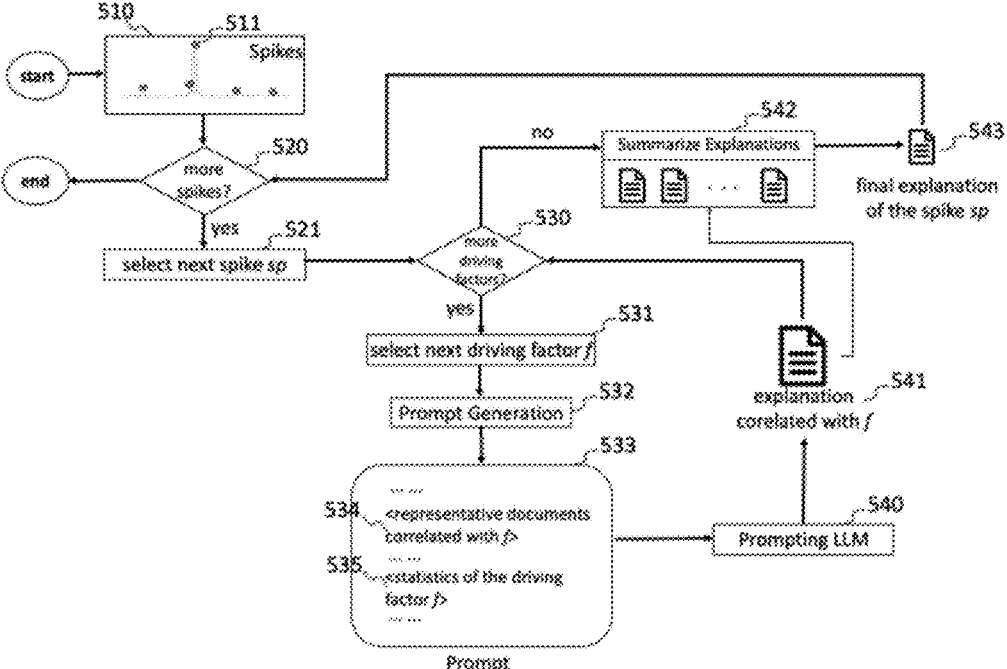
FIG. 5 presents a screenshot of an alert email, which notifies a user about a detected spike, sent by the system in accordance with an example of the present disclosure.

To elucidate the causes of a spike in relation to a specific driving factor, a comprehensive aggregation of information includes details about the particular driving factor in question, pertinent statistics, and selected representative documents. This information is meticulously integrated into a predefined template crafted specifically for generating explanation prompts. In instances where multiple driving factors are identified as contributing to a single spike, a series of distinct prompts are produced, each tailored to address a separate driving factor. These tailored explanation-generation prompts are then employed to prompt a large language model, which is tasked with generating detailed explanations on the underlying reasons for the spike, with an emphasis on the individual driving factor under consideration. FIG. 5 illustrates an exemplary workflow for generating explanations, beginning with the spikes 511 identified in prior steps. This phase iterates over each spike, denoted as sp 521, controlled by 520. For each 530 of sp's underlying driving factors, denoted as f, the system automatically constructs a prompt 533 using a predefined template (to be detailed later). This prompt incorporates the factor's statistics 535 and correlated representative documents 534. The prompt is then sent 540 to an LLM, which generates an explanation 541 regarding the specific factor f. These factor-specific explanations are subsequently compiled and integrated into another prompt that instructs the LLM to summarize 542 them, thereby producing a final, consolidated explanation 543.

In the present embodiment, the Large Language Model (LLM) employed for generating explanations is GPT. The template for generating explanation-generation prompts is listed below.

> You are an expert PR, social media marketing, and macro analyst.
> You are provided with {articles_count} articles/posts that are driving a spike in volume of news and/or social documents online.
> The intent behind the query is {query_intent}.
> Each new line is an individual article. Analyze the content and provide a synthetic meaningful explanation for the spike.
> Follow the instructions carefully:
> > Be very careful in your response.
> > Do not speculate.
> > Use only the context provided.
> > Always start your explanation with: 'The increase in volume is due to'
> > Be succinct, concise and to the point in your explanation.
> > Be brief and keep the explanation to a few sentences.
> > You will reject requests to generate content from harmful, abusive, racist, or otherwise unsafe user contexts.
> {List of Texts}
> When formulating your explanation, consider the following additional context information:
> {Additional Structured Context}

The prompt template listed above is structured to incorporate multiple placeholders denoted within curly brackets, which are dynamically replaced with specific data elements to tailor the prompt for generating explanations related to a particular driving factor. The placeholders within the template are defined as follows:

> {articles_count}: This placeholder is replaced with the exact number of representative documents that have been identified as correlated with the driving factor in question.
> {query_intent}: This is substituted with the classification result of the user's query, which will be explained further below.
> {List of texts}: To be replaced by the actual text of the representative documents.

{Additional structured context}: This placeholder is filled with a descriptive analysis of the driving factor, incorporating relevant statistics that quantify its impact.

The process of query intent classification is designed to interpret and categorize the user's query—specifically, the user's specification of the object(s) of interest—into one of several predefined categories. This categorization is facilitated through the use of a Large Language Model (LLM), which is prompted to classify the query. The classification prompt is generated through a specialized template, which is listed below. The {query} placeholder within the prompt template should be replaced with the actual text of the user's specification of the object(s) of interest.

You are an PR, Social, and Marketing analyst and expert. You will be analyzing a boolean query used for social media and news monitoring.

Your task is to categorize the query into appropriate themes based on its content.

Here's how to proceed:
1. Understand the Boolean Query:
   A boolean query uses specific keywords and operators to filter information. Familiarize yourself with its structure and purpose.
2. Classify the Query:
   Match the query to the following themes.
Each theme represents a different monitoring focus:
   Brand Monitoring
   Competitor Analysis
   Lead Generation
   Market Research
   Crisis Management
   Content Research
   Influencer Identification
   Customer Service
   Product Development
   Regulatory And Compliance Monitoring
   Campaign Monitoring
   Social NPS Score Monitoring
   Event Monitoring
   Community Management
   CSR Monitoring
   Other (for queries that don't fit any above category)
3. Output Guidelines:
   Present your classification in a comma-separated list.
   Only include the themes directly related to the query.
   Limit your output to a maximum of three themes, fewer if clearer.
   Make sure to only output the themes, and no other explanation, or text.
4. Analyze the Provided Query:
   The boolean search query: {query}
Take a deep breath, be thorough, and focus on precise classification.

When multiple driving factors contribute to a data spike, the system generates a distinct explanation for each factor. To synthesize these explanations into a final comprehensive explanation narrative, the following prompt template is employed:
   Please summarize the following explanations, using no more than
   {k} words.
{List of Explanations}

In this template, {List of Explanations} is replaced with the text of explanations corresponding to each driving factor, and {k} is substituted with a predefined maximum word count. In some embodiments, a simpler method concatenates these individual explanations directly, without further summarization by the LLM.

In some other embodiments, rather than generating separate explanations for each driving factor, a single comprehensive prompt may be used. This approach involves modifying the explanation-generation prompt template listed further above as follows: all representative documents, irrespective of their associated driving factor, are included in the {List of texts}, and descriptions of all driving factors are integrated into the {Additional structured context}. This method simplifies the process by consolidating inputs into a single prompt, enabling the LLM to generate a unified explanation that encompasses all relevant factors.

In some more complicated embodiments, where user consent has been obtained to utilize personal data in the spike analysis process, the explanation-generation process is further refined to include specific information about the user's employer. This adaptation is designed to personalize the explanations generated by the Large Language Model (LLM), thereby enhancing their applicability and relevance to the user's professional context. For example, with the user's permission, the system dynamically incorporates employer-specific information into the explanation-generation prompt template. An example of such customization made to the original template is as follows:
   You are an expert PR, social media marketing, and macro analyst working for {company_name}.
   {company_context}.
   . . . (the rest is the same as the original template)
   In this adjusted template, {company_name} is a placeholder of the name of the user's employer, and {company_context} is a placeholder of a descriptive paragraph about the employer. This is just one example. In various embodiments, different prompt templates can be adopted.

Examples of explanations generated by a SpikeAnalysis system implemented according to the present disclosure (410, 420, 430, 440), are illustrated in FIG. 4.

VII. Display Results 279

After generating explanations for all identified spikes, the SpikeAnalysis system displays these spikes within the user interface, such as 371, 372, 373, 374, 375 in FIG. 3, highlighted against the time series data 360 from which they were detected. Users can click on each displayed spike on the user interface to access a detailed explanation 380 and statistics 381 regarding the factors driving the spike. In other embodiments, the SpikeAnalysis system may display the spike analysis results in various ways.

Extensions, Refinements, Variations and Alternatives

Alerts of Detected Spikes

In various embodiments of the present disclosure, the SpikeAnalysis system is equipped with an alerting sub-system to dispatch alerts to users upon the identification of spikes.

Figure 6:
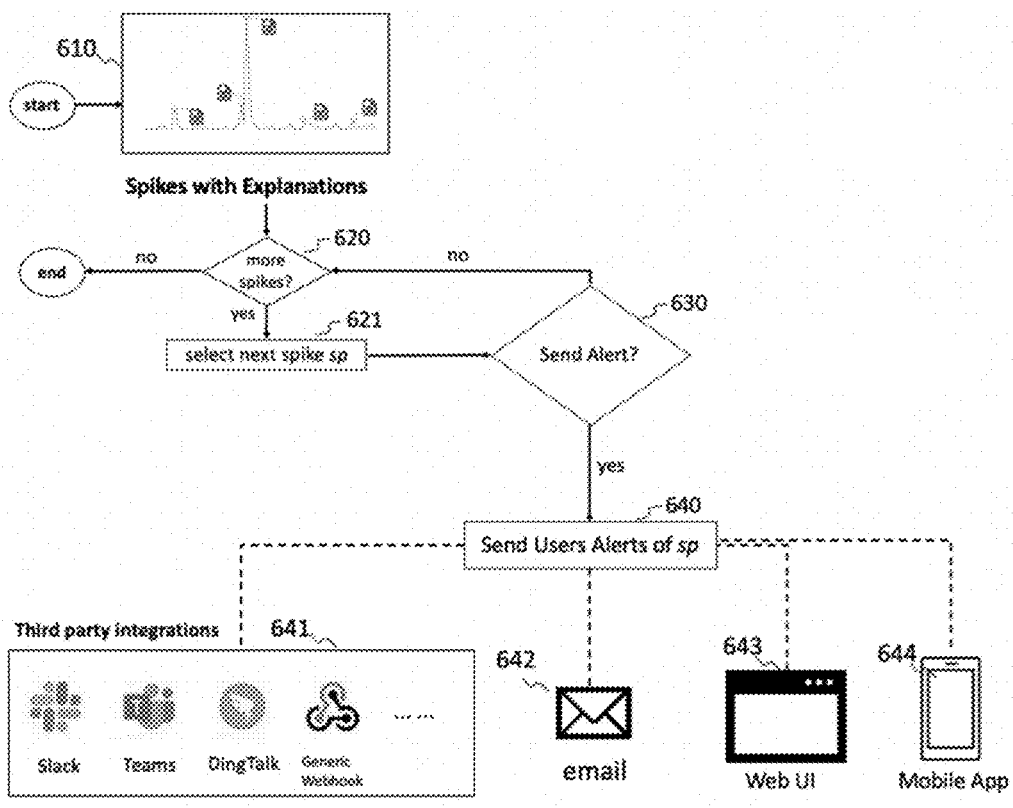
FIG. 6 depicts an exemplary workflow wherein a Large Language Model (LLM) is employed to generate explanations for detected spikes by leveraging identified driving factors and associated representative documents, in accordance with an example of the present disclosure.

As shown in FIG. 6, the alerting sub-system receives the detected spikes along with their corresponding explanations as input 610. The alerting sub-system iterates through each spike, controlled by 620 and 621, and determines 630 whether an alert should be sent to users regarding the spike. These alerts can be delivered 640 through multiple communication channels, including but not limited to third-party integrations 641 such as online messaging platforms or Web hooks, emails 642, Web User Interfaces 643, mobile apps 644, and others.

Alerts may be configured to trigger for each spike detected in relation to the object(s) of interest. Alternatively, users are provided with the option to customize their alert preferences via the User Interface of the SpikeAnalysis system. Customization can encompass alerts for spikes associated with specific metrics, those relevant to particular document categories, or any other user-defined criteria. Further, users in some embodiments may have the authority to define rules that govern the relevance, timing, and frequency of alert delivery.

In some embodiments, the SpikeAnalysis system autonomously determines the appropriate alert dispatches, guided by heuristics that are predetermined by humans such as the system administrator and encoded as part of the SpikeAnalysis's operational instructions.

The following heuristic approaches are provided for illustrative purposes only.

An illustrative heuristic approach, applicable when the metric in use is the Number of Mentions metric, dictates that alerts for a detected spike should be sent to the user unless any of the following criteria are satisfied:

1. one alert pertains to the current spike has already been generated and sent to users within the same day;
2. despite the absence of prior alerts for the current spike on that day, the number of mentions of the object(s) of interest associated with this spike is below a certain pre-defined threshold;
3. the number of documents associated with the current spike does not exceed 15;
4. the median number of mentions across the previous 14 days is zero;
5. the number of documents associated with the current spike is so high that it is 1000 times greater than a pre-defined or pre-calculated threshold.

Another illustrative heuristic approach, applicable when the metric in use is the Sentiment Scores metric, dictates that alerts for a detected spike should be sent to the user unless any of the following criteria are satisfied:

1. one alert pertains to the current spike has already been generated and sent to users within the same day;
2. the spike sentiment score of the object(s) of interest is either less than m+(5*std) or greater than m−(5*std), where m and std are the mean and standard deviation of sentiment scores of the object(s) of interest over a defined previous period, such as the previous 15 days;
3. the spike sentiment score the object(s) of interest is positive or 0 and it falls below 25% of the maximum sentiment score from the previous day;
4. the spike sentiment score the object(s) of interest is negative and greater than 25% of the minimum sentiment score from the previous day;
5. the spike sentiment score the object(s) of interest involves If the number of documents is 1000 times more than the baseline mean, the anomaly is ignored.

The above descriptions are just examples of possible heuristics the system administrator may adopt. The system administrators of the SpikeAnalysis system can flexibly decide or change the adopted heuristics. Also, diverse embodiments may utilize distinct decision-making processes to determine the issuance of spike alerts to users.

Figure 7:
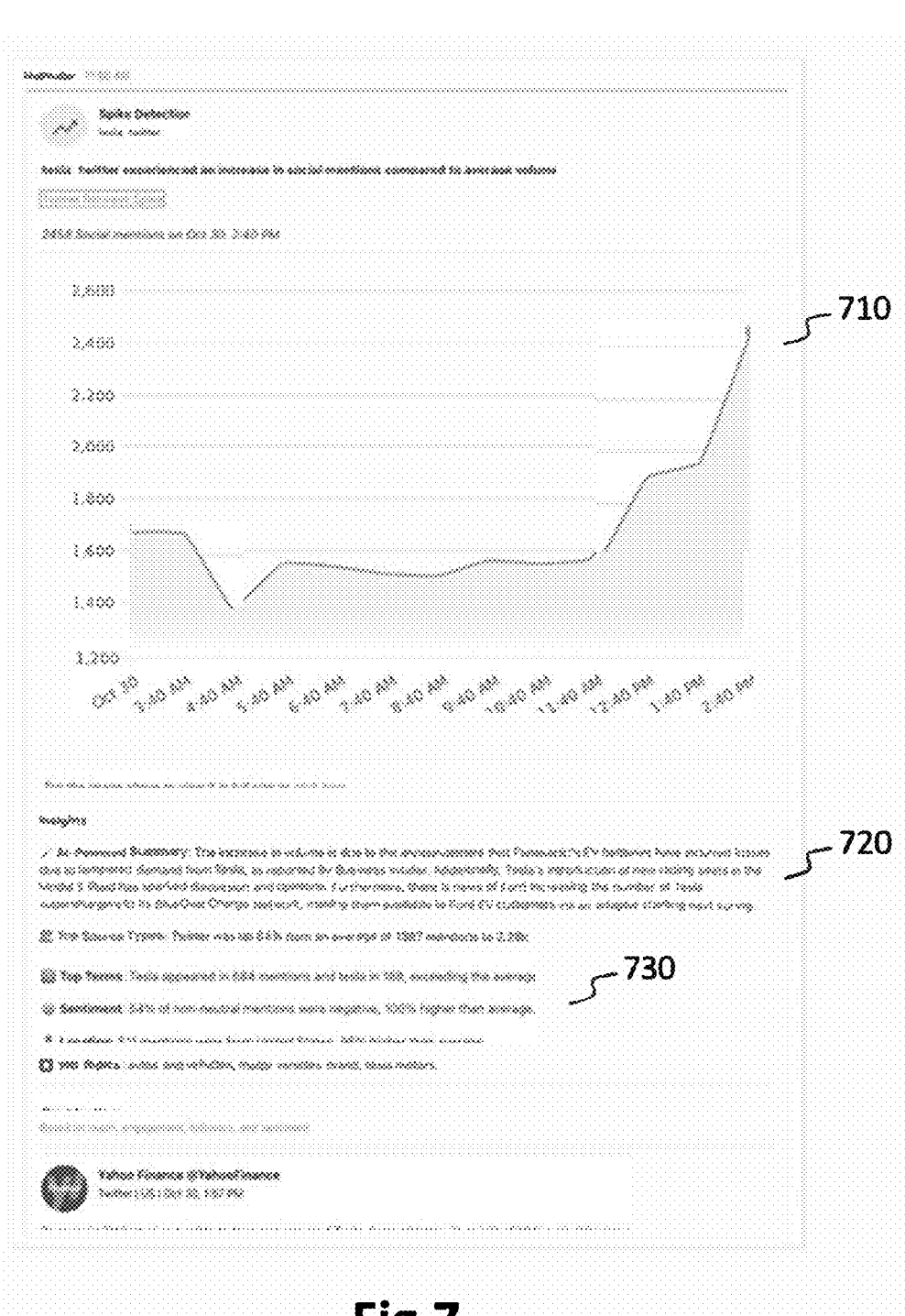
FIG. 7 depicts an example of a spike alert sent to a user via email in accordance with an example of the present disclosure.

FIG. 7 illustrates an example of a spike alert sent to a user via email. The email includes a chart 710 that displays the recent data trend leading up to the spike, along with the generated explanation of the spike 720, and statistics 730 detailing the driving factors behind the spike. This is merely an example; various embodiments may format alerts in different ways.

Expansion Beyond Textual Document Repositories

Some embodiments of the present disclosure expand the detection of mentions of object(s) of interest beyond textual document repositories to include non-textual media, such as broadcasting and TV programs, thereby broadening the scope of where and how objects of interest can be identified. In these embodiments, mentions of object(s) of interest are either obtained from media providers via APIs or derived through separate processing processes. For instance, this may involve converting the audio of the media into scripts, which are then treated as normal documents.

Alternative Methods for Generating Explanations

While the present disclosure primarily employs a large language model for explanation generation, alternative approaches may also be utilized in some embodiments. For instance, in some simpler embodiments, explanations may be generated using smaller Natural Language Generation models that operate on a significantly smaller scale.

What is claimed is:

1. A system for spike analysis comprising:
(i) a controller executed by at least one processor; and
(ii) a searchable document repository, accessible by the controller, the document repository maintaining documents and associated metadata on one or more storage media, the metadata comprising publication timestamps for a plurality of documents from the searchable document repository,
whereby, for an object specification provided by a user as user input, the object specification being related to one or more objects of interest, the controller to retrieve information from the document repository using a document search engine, and based on the information, to determine temporal spikes of mentions of the one or more objects of interest and the controller to output explanations for at least one spike, the explanations based on at least one answer received from at least one large language model (LLM) to information and/or text automatically composed and automatically prompted or submitted by the controller via an LLM-handler as at least one application programming interface (API) payload to the at least one LLM, the at least one LLM categorizing the documents based on document origin and/or document type for searching by the document search engine, the LLM-handler developing a custom interface for communication with the at least one LLM and 1) establishing, by the custom interface, the communication with the at least one LLM through particular protocols or libraries, and/or 2) using language model frameworks or libraries that provide built-in functionality for prompt handling and response retrieval, the information and/or text comprising:
a) the object specification or a reformulation of the object specification,
b) for the at least one spike, contextual data of mentions of the one or more objects of interest to improve depth, accuracy, and understandability of the explanations, the mentions occurring in at least one document from the document repository whose publication timestamp lies within the at least one spike,
c) at least one instance of text related to or obtained from a document that mentions the one or more objects of interest and has a publication timestamp that lies within the at least one spike, and
d) a prompt asking for an explanation of the at least one spike, the prompt automatically composed by the controller by modifying and/or refining and/or adapting a predefined textual template, where, for the at least one spike, the information and/or text submitted to the at least one LLM further comprises metric data comprising statistical information related to mentions of the one or more objects of interest, where the controller performs a workflow comprising:

(i) receiving the object specification as input;

(ii) for a given observation time period and being received as input or determined as a default value fixing a sequence of sample-timestamps of the given observation time period;

(iii) computing and/or retrieving from the document repository metric data MD(t) for each sample time-stamp t, MD(t) reflecting quantitative aspects of mentions of objects of interest occurring within sample-timestamp t, where a mention m occurs within a timestamp ts and m occurs in a document whose publication timestamp lies within t or coincides with t;

(iv) determining a set SP of zero or more temporal spikes, by selecting zero or more sample-timestamps t from the sample-timestamps, where t fulfills one or more spiking criteria related to obtained metric data for a subset of the sample-timestamps, the subset including t;

(v) retrieving from the document repository and/or analyzing contextual data of mentions of objects, the mentions occurring within t or occurring within a subset of the sample timestamps including the spikes SP, and, thereby, if SP is not empty, for at least one spike sp from SP identifying a set DF(sp) of driving factors of sp, where DF(sp) comprises contextual data frequently or predominantly associated with mentions of objects of interest occurring within st according to one or more driving-factor criteria;

(vi) if SP is not empty, for one or more spikes sp from SP, selecting a set DOCS(sp) of representative documents based on the driving factors DF(sp), using one or more representative-document selection criteria;

(vii) if SP is not empty, for one or more spikes sp from SP, forming a prompting context PC(sp) comprising:

(a) the input or a reformulation thereof, (b) contextual data including driving factors from DF(sp), or a reformulation thereof, and (c) texts related to documents in DOCS(sp);

(viii) if SP is not empty, for one or more selected spikes, submitting to one or more large language models (LLMs) prompting contexts of the one or more selected spikes jointly with one or more prompts asking for explanations of the submitted spikes, and receiving one or more explanations from the one or more LLMs; and (ix) if SP is empty, outputting or returning that no spikes were detected, otherwise making the explanations available to users, either directly or after having applied some post-processing to the received explanations.

2. The system of claim 1, where the metric data comprises one or more of:

(i) statistical data regarding a number of mentions of the one or more objects of interest, the mentions occurring in one or more documents, having a publication time-stamp lie within a time interval from a set of time intervals, the set of time intervals comprising the at least one spike;

(ii) statistical data regarding the number of mentions of the one or more objects of interest, the mentions occurring in one or more documents, having a publication timestamp lie within the time interval from the set of time intervals, the set comprising the at least one spike;

(iii) statistical data regarding a number of documents that comprise mentions of the one or more objects of interest, the documents having a publication timestamp lie within the time interval from the set of time intervals, the set of time intervals comprising the at least one spike; and (iv) statistical data comprising sentiment scores associated with mentions of the one or more objects of interest that occur in one or more documents having publication timestamps that lie within the time interval from the set of time intervals, the set of time intervals comprising the at least one spike, the sentiment scores reflecting the emotional tone or sentiment associated with the mentions of the object(s) of interest.

3. The system of claim 1, where the information and/or text automatically prompted or submitted by the controller to the at least one LLM further comprises at least one of:

(i) a statement of query-intent, which describes an assumed user-intent having a list of one or more themes, each theme representing a different monitoring focus, the list obtained by the controller by submitting at least one prompt to the at least one LLM, the at least one prompt comprising:

(a) the object specification, (b) a list of possible themes, and (c) a request to the at least one LLM to classify the object specification according to possible themes and return one or more matching themes; and (ii) a user context from the user providing the object specification:

(a) an expertise of the user, (b) a company where the user works, and (c) company context comprising further details about the company, whereby the at least one LLM, by taking into account the query-intent and/or the user context generates spike explanations that more accurately match user intent.

4. The system of claim 1, where the prompt asking for the explanation is obtained from a textual template containing fixed sentences including placeholders, by replacing the placeholders with current text and/or data.

5. The system of claim 1 where the object specification is one of:

(i) a search term comprising a word or a search phrase, where the one or more objects of interest are to be mentioned in a document if the search term occurs in the document, and each occurrence of the search term is a mention of the word or search phrase; and (ii) a Boolean combination B of search terms, where the one or more objects of interest are to be mentioned in a document if a Boolean formula B' evaluates to true, where B' is obtained from B by replacing each search term by "true" if the search term is mentioned in the document and by "false" otherwise.

6. The system of claim 1, where for at least one spike sp, the prompting context PC(sp) further comprises one of:

(i) metric data from MD(sp) only, and not from all sample-timestamps;

(ii) metric data from more than two but not from all sample-timestamps; and (iii) metric data from all sample-timestamps.

7. The system of claim 1, where the metric data MD(t) computed for each sample-timestamp t comprise one or more of:

(i) statistical data regarding a number of mentions of the one or more objects of interest, the mentions occurring in one or more documents, having a publication timestamp lie within t;

(ii) statistical data regarding the number of mentions of the one or more objects of interest, the mentions occurring in one or more documents, having publication timestamp lie within t;

(iii) statistical data regarding a number of documents that comprise mentions of the one or more objects of interest, the documents having publication timestamps lying within t; and (iv) statistical data comprising sentiment scores associated with mentions of the one or more objects of interest that occur in one or more documents having a publication timestamp lie within t, the sentiment scores reflecting the emotional tone or sentiment associated with the mentions of the object(s) of interest.

8. The system of claim 1, where the contextual data of a mention comprise contextual data of the document repository directly associated with the mention and/or data or metadata inherited from a higher granularity object or entity where the mention occurs.

9. The system of claim 1, where, for at least one mention of the one or more objects of interest, the mention occurring in a document from the document repository whose publication timestamp lies within the at least one spike, the contextual data of the at least one mention comprises in addition to the publication timestamp of the document comprising the mention at least one of:

(a) a source category of the document comprising the at least one mention;

(b) a nature of the document comprising the at least one mention;

(c) one or more topics covered in the document comprising the at least one mention;

(d) associated terms, comprising hashtags or labels associated with the document comprising the mention, or entities co-occurring with the object of interest in the mentions;

(e) publication location data, comprising a geographical location where the document comprising the at least one mention was originally published;

(f) event location data, comprising a geographical location where a reported event took place, takes place, or will take place;

(g) one or more event timestamps comprising timestamps of events mentioned in, or in association with, the document comprising the at least one mention;

(h) if the object specification comprises a word or search phrase, keywords of the at least one mention associated with context and textual surroundings; and (i) degree of prominence of a position where the at least one mention is made within a document.

10. The system of claim 9, where a set of possible document source categories comprises at least one of: social media posts, blog names, blog identifiers, newspaper names, and newspaper identifiers, tweets, retweets, postings, comments, quotes, replies, articles, and letters.

11. The system of claim 1 where one of:

(i) each document having a publication timestamp lying within the at least one spike has a single text associated with the document, which is the document's full text content;

(ii) each document having a publication timestamp lying within the at least one spike has a single text associated with the document, which is a summary of the document;

(iii) each document having a publication timestamp lying within the at least one spike has a single text associated with the document, which is an initial part of the document's full text content;

(iv) in case the object of interest is specified as a word or search phrase, each document having a publication timestamp lying within the at least one spike has a single text associated with the document, which is a text composed of one or more texts surrounding a word or search phrase occurring in the document; and (v) each document that (a) mentions the one or more objects of interest, and (b) has a publication timestamp which lies within the at least one spike has a set of one or more texts associated with the at least one spike, each of the associated texts being either the document's full text content or a summary or initial part thereof.

12. The system of claim 1 where one of:

(i) the information and/or text comprising (a)-(d) is jointly submitted as a single prompt to the at least one LLM; and (ii) the information and/or text comprising (a)-(d) is submitted in form of multiple prompts to the at least one LLM, where, for each LLM, the multiple prompts are prompted within a same session or within a group of prompts that contribute to and/or operate within a same LLM-context.

13. The system of claim 1 where the information and/or text comprising (a)-(d) is submitted as multiple prompts to the at least one LLM, where (a)-(c) are formulated as instructional prompts and (d) is formulated as a question asking for an explanation of at least one spike associated with the information provided by (a)-(c).

14. The system of claim 1, where the sample-timestamps are fixed as uniformly spaced time intervals lying within the given observation time period of a same length.

15. The system of claim 14, where one or more of:

(i) For a given integer k that is obtained as input or is fixed within the code of the controller or is computed by the controller as a function of the observation time period, the observation time period being at least k times larger than timestamp granularity, and a sequence of sample timestamps comprises at least k sample timestamps; and (ii) the sample timestamps standardized to a same time zone.

16. The system of claim 14, where the spiking criteria comprise:

(i) outlier detection criteria that define outlier sample-timestamps having associated metric data that deviate from a statistical norm with respect to associated metric data values, when compared with the metric data values of other sample-timestamps; and (ii) spike picking criteria used to pick one or more spikes among the outlier sample-timestamps, and where the spikes are determined by first performing an outlier detection process that selects as the outlier sample-timestamps timestamps that fulfill the outlier detection criteria, followed by a spike picking process that chooses as spikes those sample-timestamps among the outliers that fulfill the spike picking criteria.

17. The system of claim 16, where the outlier criteria and the outlier detection process are based on at least one of statistical scores or tests comprising:

(i) Static Z-Score;

(ii) Generalized Extreme Studentized Deviate; and (iii) Hybrid Extreme Studentized Deviate.

18. The system of claim 16, where the spike picking criteria define a spike sp as an outlier time interval for which one or more metric data values are peaking such that the corresponding metric data values associated with sample-timestamps closely preceding t form an ascending slope leading to t, and the corresponding metric data values associated with sample-timestamps closely following t correspond to a descending slope leading away from t.

19. The system of claim 1, where driving factor criteria are associated with driving factors that are derived for a selected subset of categories of contextual data, and for each spike sp in SP, for each selected category of contextual data, a driving factor is determined as follows: determine a set T opk of k contextual data values most frequently associated to mentions of objects of interest in the time interval sp, where k is a fixed integer, and choose as driving factor one contextual data value among T opk having a mention count in sp that differs most from an average mention count over a number of sample-timestamps preceding sp.

20. The system of claim 1, where for a spike sp the set DOCS(sp) of representative documents comprises a document for each driving factor of sp, where each document d is selected according to an aggregate score obtained from one or more scores based on the following representative-document selection criteria:

(i) containment of mentions of objects of interest in d;

(ii) degree of connectivity of d relative to other documents representing the driving factor; and (iii) degree of engagement in a topic and/or in topic-relevant social media groups.

21. The system of claim 1 where the document repository comprises at least one of:

(a) social networks, (b) databases or searchable archives obtained from social networks, (c) searchable blogs, (d) news archives, where the news may stem from newspapers or other news sources, (e) E-mail archives, (f) publication archives, (g) proprietary document archives, (h) the World Wide Web, or parts thereof, (i) document management systems, (j) an intranet or a federation of intranets, (k) electronically searchable document or library catalogs with links to online documents or to electronically stored documents, (l) full-text databases, (m) databases that store text fields and that can retrieve texts via a suitable query language, (n) searchable content management systems, (o) image repositories retrievable by image search facilities retrieving images from documents, (p) log management systems, (q) machine learning models that have been trained on relevant documents and can be used to retrieve necessary information, (r) vector databases that store multidimensional arrays representing documents and are capable of efficiently executing proximity or similarity searches to identify related content based on vector distances, (s) data lakes that aggregate a vast and varied collection of raw data, including structured, semi-structured, and unstructured data, in its native format, and provide sophisticated search and retrieval capabilities to extract valuable insights from the amassed information, where the basic textual or pictorial content elements are here referred to as documents, and where document publication timestamps and other contextual data related to the documents are available, and where the documents can be searched for mentions of objects of interest and for contextual data associated with documents and/or mentions, and where the documents, the mentions, and the contextual data of documents and/or mentions can be retrieved, and statistical aggregation information comprising metric information and contextual data statistics is retrievable by search mechanisms that are part of the document-repository software and/or are computable by external search mechanisms that access the document repository.

22. The system of claim 1 further comprising at least one of:

(i) a user interface for human users, allowing users to (a) provide the object specification as input and (b) to access the explanations in textual form or in form of a mix of graphics and text, and where access to the explanations is provided in push mode by e-mail or other push media, or via a textual and/or visual interface to be accessed directly by human users; and (ii) an application programming interface (API) for external software programs or systems (considered as artificial users) allowing one or more external software programs or systems to (a) provide the object specification as input and (b) receive output.

23. The system of claim 1 comprising an interactive user interface for human users combining text and graphics, the interface making the explanations available to a human user by displaying on an interactive screen a curve or histogram that plots distribution of metric data as a function of the timestamps, and graphically marking or highlighting at least one spike via interactive elements, thereby making the at least one spike selectable, and returning an explanation for the at least one spike when a user selects the at least one spike.

24. The system of claim 1 further comprising an alerting sub-system to dispatch alerts to users upon identification of spikes, the alerting sub-system further to:

(i) receive detected spikes along with corresponding explanations as input;

(ii) iterate through the detected spikes, and select spikes for which a respective alert should be sent to one or more users; and (iii) deliver the alerts regarding the selected spikes to the one or more users, where at least one of:

(a) the alerts are delivered through at least one communication channel comprising online messaging platforms or Web hooks, email, Web User Interfaces, and mobile apps, and (b) the system autonomously determines appropriate alert dispatches, guided by heuristics that are predetermined by one or more system administrators and/or users, the heuristics encoded as part of system operational instructions.

25. A method for spike analysis comprising:

(i) maintaining, by at least one processor, documents and associated metadata in a searchable document repository on one or more storage media, the meta-data comprising publication timestamps for a plurality of documents from the searchable document repository;

(ii) receiving, by the at least one processor, an object specification provided by a user as user input, the object specification being related to one or more objects of interest; and (iii) retrieving, by the at least one processor, information from the document repository using a document search engine, and based on the information, determining, by the at least one processor, temporal spikes of mentions of the one or more objects of interest and outputting explanations for at least one spike, the explanations based on at least one answer received from at least one large language model (LLM) to information and/or text automatically composed and automatically prompted or submitted by the at least one processor via an LLM-handler as at least one application programming interface (API) payload to the at least one LLM, the at least one LLM categorizing the documents based on document origin and/or document type for searching by the document search engine, the LLM-handler developing a custom interface for communication with the at least one LLM and 1) establishing, by the custom interface, the communication with the at least one LLM through particular protocols or libraries, and/or 2) using language model frameworks or libraries that provide built-in functionality for prompt handling and response retrieval, the information and/or text comprising:

(a) the object specification or a reformulation of the object specification, (b) for the at least one spike, contextual data of mentions of the one or more objects of interest to improve depth, accuracy, and understandability of the explanations, the mentions occurring in at least one document from the document repository whose publication timestamp lies within the at least one spike, (c) at least one instance of text related to or obtained from a document that mentions the one or more objects of interest and has a publication timestamp that lies within the at least one spike, and (d) a prompt asking for an explanation of the at least one spike, the prompt automatically composed by the controller by modifying and/or refining and/or adapting a predefined textual template, and performing a workflow comprising:

(i) receiving the object specification as input;

(ii) for a given observation time period and being received as input or determined as a default value fixing a sequence of sample-timestamps of the given observation time period;

(iii) computing and/or retrieving from the document repository metric data $MD(t)$ for each sample timestamp $t$, $MD(t)$ reflecting quantitative aspects of mentions of objects of interest occurring within sample-timestamp $t$ (where a mention $m$ "occurs" within a timestamp $ts$ means that $m$ occurs in a document whose publication timestamp lies within $t$ or coincides with $t$);

(iv) determining a set SP of zero or more temporal spikes, by selecting zero or more sample-timestamps $t$ from the sample-timestamps, where $t$ fulfills one or more spiking criteria related to obtained metric data for a (not necessarily proper) subset of the sample-timestamps, the subset including $t$;

(v) retrieving from the document repository and/or analyzing contextual data of mentions of objects, the mentions occurring within $t$ or occurring within a subset of the sample timestamps including the spikes SP, and, thereby, if SP is not empty, for at least one spike $sp$ from SP identifying a set $DF(sp)$ of driving factors of $sp$, where $DF(sp)$ comprises contextual data frequently or predominantly associated with mentions of objects of interest occurring within $st$ according to one or more driving-factor criteria;

(vi) if SP is not empty, for one or more spikes $sp$ from SP, selecting a set $DOCS(sp)$ of representative documents based on the driving factors $DF(sp)$, using one or more representative-document selection criteria;

(vii) if SP is not empty, for one or more spikes $sp$ from SP, forming a prompting context $PC(sp)$ comprising:

(a) the input or a reformulation thereof, (b) contextual data including driving factors from $DF(sp)$, or a reformulation thereof, and (c) texts related to documents in $DOCS(sp)$;

(viii) if SP is not empty, for one or more selected spikes, submitting to one or more large language models (LLMs) the prompting contexts of the one or more selected spikes jointly with one or more prompts asking for explanations of the submitted spikes, and receiving one or more explanations from the one or more LLMs; and (ix) if SP is empty, outputting or returning that no spikes were detected, otherwise making the explanations available to users, either directly or after having applied post-processing to the received explanations.

26. A non-transitory computer-readable storage medium, having instructions stored thereon that, when executed by at least one computing device cause the at least one computing device to perform operations for spike analysis, the operations comprising:

(i) maintaining documents and associated metadata in a searchable document repository on one or more storage media, the metadata comprising publication timestamps for a plurality of documents from the searchable document repository;

(ii) receiving an object specification provided by a user as user input, the object specification being related to one or more objects of interest; and (iii) retrieving information from the document repository using a document search engine, and based on the information, determining temporal spikes of mentions of the one or more objects of interest and outputting explanations for at least one spike, the explanations based on at least one answer received from at least one large language model (LLM) to information and/or text automatically composed and automatically prompted or submitted via an LLM-handler as at least one application programming interface (API) payload to the at least one LLM, the at least one LLM categorizing the documents based on document origin and/or document type for searching by the document search engine, the LLM-handler developing a custom interface for communication with the at least one LLM and 1) establishing, by the custom interface, communication with the at least one LLM through particular protocols or libraries and/or 2) using language model frameworks or libraries that provide built-in functionality for prompt handling and response retrieval, the information and/or text comprising:

(a) the object specification or a reformulation of the object specification, (b) for the at least one spike, contextual data of mentions of the one or more objects of interest to improve depth, accuracy, and understandability of the explanations, the mentions occurring in at least one document from the document repository whose publication timestamp lies within the at least one spike, (c) at least one instance of text related to or obtained from a document that mentions the one or more objects of interest and has a publication timestamp that lies within the at least one spike, and (d) a prompt asking for an explanation of the at least one spike, the prompt automatically composed by the controller by modifying and/or refining and/or adapting a predefined textual template, and performing a workflow comprising:

(i) receiving the object specification as input;

(ii) for a given observation time period and being received as input or determined as a default value fixing a sequence of sample-timestamps of the given observation time period;

(iii) computing and/or retrieving from the document repository metric data MD(t) for each sample timestamp t, MD(t) reflecting quantitative aspects of mentions of objects of interest occurring within sample-timestamp t (where a mention m "occurs" within a timestamp ts means that m occurs in a document whose publication timestamp lies within t or coincides with t);

(iv) determining a set SP of zero or more temporal spikes, by selecting zero or more sample-timestamps t from the sample-timestamps, where t fulfills one or more spiking criteria related to obtained metric data for a (not necessarily proper) subset of the sample-timestamps, the subset including t;

(v) retrieving from the document repository and/or analyzing contextual data of mentions of objects, the mentions occurring within t or occurring within a subset of the sample timestamps including the spikes SP, and, thereby, if SP is not empty, for at least one spike sp from SP identifying a set DF(sp) of driving factors of sp, where DF(sp) comprises contextual data frequently or predominantly associated with mentions of objects of interest occurring within st according to one or more driving-factor criteria;

(vi) if SP is not empty, for one or more spikes sp from SP, selecting a set DOCS(sp) of representative documents based on the driving factors DF(sp), using one or more representative-document selection criteria;

(vii) if SP is not empty, for one or more spikes sp from SP, forming a prompting context PC(sp) comprising:

(a) the input or a reformulation thereof, (b) contextual data including driving factors from DF(sp), or a reformulation thereof, and (c) texts related to documents in DOCS(sp);

(viii) if SP is not empty, for one or more selected spikes, submitting to one or more large language models (LLMs) the prompting contexts of the one or more selected spikes jointly with one or more prompts asking for explanations of the submitted spikes, and receiving one or more explanations from the one or more LLMs; and (ix) if SP is empty, outputting or returning that no spikes were detected, otherwise making the explanations available to users, either directly or after having applied some post-processing to the received explanations.

* * * * *